(12) United States Patent
O'Sullivan

(10) Patent No.: US 8,260,907 B2
(45) Date of Patent: Sep. 4, 2012

(54) METHODS, SYSTEMS AND COMPUTER PROGRAM PRODUCTS FOR TRIGGERED DATA COLLECTION AND CORRELATION OF STATUS AND/OR STATE IN DISTRIBUTED DATA PROCESSING SYSTEMS

(75) Inventor: Patrick Charles O'Sullivan, Reston, VA (US)

(73) Assignee: CA, Inc., Islandia, NY (US)

( * ) Notice: Subject to any disclaimer, the term of this patent is extended or adjusted under 35 U.S.C. 154(b) by 1127 days.

(21) Appl. No.: 10/405,463

(22) Filed: Apr. 3, 2003

(65) Prior Publication Data

US 2003/0191989 A1 Oct. 9, 2003

Related U.S. Application Data

(60) Provisional application No. 60/369,580, filed on Apr. 4, 2002.

(51) Int. Cl.
*G06F 15/173* (2006.01)
*H04L 12/28* (2006.01)

(52) U.S. Cl. ............... 709/224; 709/238; 370/389

(58) Field of Classification Search .......... 709/224
See application file for complete search history.

(56) References Cited

U.S. PATENT DOCUMENTS

| | | | |
|---|---|---|---|
| 6,137,782 A * | 10/2000 | Sharon et al. | 370/255 |
| 6,412,011 B1 | 6/2002 | Agraharam et al. | |
| 6,453,345 B2 * | 9/2002 | Trcka et al. | 709/224 |
| 6,467,052 B1 * | 10/2002 | Kaler et al. | 714/39 |
| 6,477,575 B1 | 11/2002 | Koeppel | |
| 6,658,367 B2 * | 12/2003 | Conrad | 702/176 |
| 6,681,247 B1 | 1/2004 | Payton | |
| 6,714,976 B1 * | 3/2004 | Wilson et al. | 709/224 |
| 6,738,933 B2 * | 5/2004 | Fraenkel et al. | 714/47.2 |
| 6,816,907 B1 * | 11/2004 | Mei et al. | 709/229 |
| 6,839,767 B1 * | 1/2005 | Davies et al. | 709/232 |
| 6,839,850 B1 * | 1/2005 | Campbell et al. | 726/23 |
| 6,850,974 B2 | 2/2005 | Schweitzer | |
| 6,857,020 B1 | 2/2005 | Chaar | |

(Continued)

FOREIGN PATENT DOCUMENTS

WO WO01/20918 3/2001

OTHER PUBLICATIONS

Smarts, Technical Paper—Event Modeling with the MODEL Language: A Tutorial Introduction, not dated, 19 pages, System Management Arts (SMARTS), White Plains, New York.

(Continued)

*Primary Examiner* — Peling Shaw
*Assistant Examiner* — Joiya M Cloud
(74) *Attorney, Agent, or Firm* — Vierra Magen Marcus & DeNiro LLP

(57) ABSTRACT

Methods, systems and computer program products for collecting data processing system status information monitoring network communications with the data processing system to observe transaction(s) associated with the data processing system. The transaction(s) is analyzed to determine if the transaction(s) complies with a quality standard and a trigger is generated based on the analysis of the transaction(s). System status information is collected responsive to the generation of the trigger. The collection of system status information may be provided by collecting system status information so that collection of the system status information automatically time correlates the collected system status information with the trigger.

20 Claims, 14 Drawing Sheets

U.S. PATENT DOCUMENTS

| | | | |
|---|---|---|---|
| 6,862,622 B2 | | 3/2005 | Jordensen |
| 6,941,367 B2 * | | 9/2005 | Vosseler et al. ............... 709/224 |
| 6,970,924 B1 | | 11/2005 | Chu |
| 7,003,781 B1 * | | 2/2006 | Blackwell et al. ............ 719/327 |
| 7,076,695 B2 * | | 7/2006 | McGee et al. ............... 714/47.2 |
| 7,093,013 B1 * | | 8/2006 | Hornok et al. ................ 709/224 |
| 7,126,910 B1 | | 10/2006 | Sridhar |
| 7,194,533 B1 | | 3/2007 | DeLuca |
| 7,197,559 B2 * | | 3/2007 | Goldstein et al. ............. 709/224 |
| 7,209,906 B2 | | 4/2007 | Goodwin |
| 7,243,143 B1 * | | 7/2007 | Bullard ......................... 709/223 |
| 7,299,277 B1 * | | 11/2007 | Moran et al. .................. 709/224 |
| 2002/0029265 A1 * | | 3/2002 | Mizoguchi .................... 709/223 |
| 2002/0038228 A1 * | | 3/2002 | Waldorf et al. .................... 705/7 |
| 2002/0042823 A1 | | 4/2002 | DeBettencourt |
| 2002/0049841 A1 | | 4/2002 | Johnson |
| 2002/0065912 A1 * | | 5/2002 | Catchpole et al. ............ 709/224 |
| 2002/0122422 A1 | | 9/2002 | Kenney |
| 2002/0145981 A1 * | | 10/2002 | Klinker et al. ................ 370/244 |
| 2002/0152305 A1 | | 10/2002 | Jackson |
| 2002/0169870 A1 * | | 11/2002 | Vosseler et al. ............... 709/224 |
| 2002/0174219 A1 | | 11/2002 | Mei |
| 2003/0025599 A1 | | 2/2003 | Monroe |
| 2003/0046224 A1 | | 3/2003 | Mujtaba et al. |
| 2003/0079018 A1 | | 4/2003 | Shahid |
| 2003/0079019 A1 | | 4/2003 | Lolayekar |
| 2003/0079160 A1 * | | 4/2003 | McGee et al. ................... 714/39 |
| 2003/0120822 A1 | | 6/2003 | Langrind |
| 2003/0131087 A1 | | 7/2003 | Shippy |
| 2003/0206116 A1 | | 11/2003 | Weiner |
| 2006/0095569 A1 | | 5/2006 | O'Sullivan |
| 2006/0095570 A1 | | 5/2006 | O'Sullivan |

OTHER PUBLICATIONS

Mercury Interactive, Mercury Interactive Topaz Prism, 2001, 2 pages, Mercury Interactive, Sunnyvale, California.

Yoav Banin, Topaz Auto RCA, Mercury Interactive, 2002, 22 pages, Mercury Interactive, Sunnyvale, CA.

Covasoft, CovaOne: Next Generation Management for E-Business, Jan. 2002, 15 pages, Covasoft, Austin, Texas.

Covasoft, CovaOne: Extending CovaOne's Benefits Throughout the Enterprise, Nov. 2001, 19 pages, Austin, Texas.

Tivoli, Tivoli Application Performance Management, Measuring End-User Experience, 2001, 4 pages, IBM, no location cited.

Mercury Interactive, Topaz Web Application Performance Management, 1999, 4 pages, Mercury Interactive, Sunnyvale, California.

Brix: The Brix System for Pervasive End-to-End IP Service Level Verification, May 2000, 14 pages, Brix Networks, Chelmsford, Massachusetts.

Smarts, Technical Paper—High Speed and Robust Event Correlation, 1996, 15 pages, System Management Arts (SMARTS), White Plains, NY.

Tealeaf, IntegriTea, Tealeaf Technology Technical White Paper, Mar. 2002, 24 pages, Tealeaf Technology, Inc., San Francisco, California.

Entuity, True Cause Analytics and Heightened Awareness, a service-centric view of network management, Entuity, Jan. 2002, 11 pages, New York, New York.

Lucent, Transact Toolkit 7.1 User's Guide, 2000, 222 pages, Lucent Technologies, Sunnyvale, California.

Lucent, VitalAnalysis 7.0 User's Guide, 2000, 182 pages, Lucent Technologies, Sunnyvale, California.

Lucent, VitalHelp 7.0 User's Guide, 2000, 172 pages, Lucent Technologies, Sunnyvale, California.

Lucent, VitalSuite 7.0 Administrator's Guide, 1999, 364 pages, Lucent Technologies, Sunnyvale, CA.

Office Action, dated Feb. 1, 2008, U.S. Appl. No. 11/304,167, filed Dec. 15, 2005.

Office Action, dated Jan. 24, 2008, U.S. Appl. No. 11/300,943, filed Dec. 15, 2005.

Office Action for U.S. Appl. No. 11/304,167.

Office Action for U.S. Appl. No. 11/300,943.

Response to Office Action, dated Jun. 26, 2007, U.S. Appl. No. 11/304,167, filed Dec. 15, 2005.

Final Office Action dated Sep. 11, 2007, U.S. Appl. No. 11/304,167, filed Dec. 15, 2005.

Response to Office Action, dated Jun. 1, 2007, U.S. Appl. No. 11/300,943, filed Dec. 15, 2005.

Final Office Action dated Aug. 24, 2007, U.S. Appl. No. 11/300,943, filed Dec. 15, 2005.

Response to Office Action, dated Oct. 29, 2007, U.S. Appl. No. 11/304,167, filed Dec. 15, 2005.

Response to Office Action, dated Oct. 29, 2007, U.S. Appl. No. 11/300,943, filed Dec. 15, 2005.

Decision on Appeal, dated Jun. 29, 2010, U.S. Appl. No. 11/304,167.

Decision on Appeal, dated Jun. 29, 2010, U.S. Appl. No. 11/300,943.

Appeal Brief, dated Nov. 6, 2008, U.S. Appl. No. 11/304,167.

Reply Brief to Examiner's Answer, dated Apr. 4, 2009, U.S. Appl. No. 11/304,167.

Appeal Brief, dated Nov. 6, 2008, U.S. Appl. No. 11/300,943.

Corrected Appeal Brief, dated Dec. 16, 2008, U.S. Appl. No. 11/300,943.

Reply Brief to Examiner's Answer, dated Apr. 6, 2009, U.S. Appl. No. 11/300,943.

Office Action dated Jun. 27, 2008, U.S. Appl. No. 11/304,167, filed Dec. 15, 2005.

Office Action dated Jun. 25, 2008, U.S. Appl. No. 11/300,943, filed Dec. 15, 2005.

* cited by examiner

METHODS, SYSTEMS AND COMPUTER PROGRAM PRODUCTS FOR TRIGGERED DATA COLLECTION AND CORRELATION OF STATUS AND/OR STATE IN DISTRIBUTED DATA PROCESSING SYSTEMS

CLAIM OF PRIORITY

The present application claims priority from U.S. Provisional Patent Application Ser. No. 60/369,580, entitled "Methods, systems, and computer program products for triggered data collection and correlation of status and/or state in distributed data processing networks, systems, and/or applications", filed Apr. 4, 2002, the disclosure of which is incorporated herein by reference as if set forth in its entirety.

FIELD OF THE INVENTION

This invention relates generally to data processing systems, and more particularly, to the management of distributed data processing systems.

BACKGROUND OF THE INVENTION

Distributed data processing may pose a unique set of management challenges. Because functionality is, typically, distributed and may interact across a wide variety of communications media including, but not limited to, local area networks (LANS), wide area networks (WANS), satellite communications, cellular networks, packet radio networks, and so forth, it may be difficult to manage service quality in such systems, in locating the components causing service quality problems, and/or in allocating resources to improve service quality. Because a data processing system may be composed of a number of physical and logical systems, and these systems may in turn host a great number of software components, which in turn, may host more dependent software components, the problem may not be just one of distribution, but of complexity as well.

Many of these discrete hardware and software components may be instrumented to provide visibility into the status and/or state of the specific component and of the data processing system comprised, in whole or in part, of these components. A distributed data processing system may include hundreds, or even thousands of these components. Each component may have tens or hundreds of instrumented measures and attribute data. The volume of data available for inspection may make it difficult, if not impossible, to ascertain the causes of service quality problems in complex distributed data processing systems.

Conventionally, ascertaining the causes of service quality problems has, typically, been provided by component status evaluation and/or service status evaluation. Component status is, typically, evaluated through the use of component monitors. Service status is, typically, estimated by correlating and/or aggregating component status to a service through the use of a component-to-service mapping. Typically, no direct measure of service status is used.

Service status may be measured directly through the use of service monitors. Service monitors may be active testing monitors, passive monitors, or a combination of the two. Component status may be evaluated through the use of component monitors. Component status may be time-correlated with service status. Time correlation may occur with or without a service-to-component mapping.

When determining component status one existing approach has been to generate a "trap" by an instrumented component when the component instrumentation detects a problem with the component. In the event that a large number of components experience a problem, a large number of these traps may be generated as well. The problems experienced and traps generated may be independent, or they may be causally linked; where a problem with one component causes a problem to be detected in one or more subsequent components. Conventional systems attempt to provide for the reduction, correlation, analysis, and display of these component traps to reduce the number of traps presented to an operator to a manageable number, and to help operators find the root cause of a system problem.

Service quality could be affected when one or more components involved in the delivery of the service experience a problem or problems. Some method of mapping component traps to services is typically applied to determine that a component trap may be associated with the delivery of a service. This mapping may be as simple as listing the components involved in the service, or more advanced techniques for service-to-component mapping may be applied.

To more directly detect deficiencies in performance and/or availability another approach has been developed; the monitoring of service transactions to ascertain compliance to one or more standards of performance and/or availability. Two well-known methods used for ascertaining performance and/or availability are active testing and passive monitoring.

An active testing approach may, typically, use simulated transactions to exercise a service. These simulated transactions are typically designed to represent the types of transactions actual users of the service would execute. Users of the service may include people interacting directly with the service via a human/computer interface, or intermediate computers acting under programmatic control on behalf of users. These simulated transaction generators may be located completely within a management domain, or they may be located in multiple management domains, as in the case where robotic transaction generators located at diverse points in the Internet exercise services delivered via the Internet.

In the passive monitoring approach, typically, an "agent" monitors actual users of the service with little or no perturbation of the service. These passive monitoring systems may be implemented as an agent on a client computer, as an agent running on a dedicated monitoring system, as an agent on a host system, and/or as a combination of two or more of these implementations.

Service monitoring approaches combining active testing and passive monitoring may be implemented as well.

In both the active testing approach and the passive monitoring approach performance and/or availability may be measured and compared to a standard or standards on an ongoing basis. Such standards are often referred to as "service level agreements." In the case of the active testing approach periodic tests may be run. In the case of the passive monitoring approach the execution of actual transactions may activate the monitoring function.

When service level agreements are not met service traps may be generated which indicate non-conformance. These service traps may be reduced, correlated, analyzed, and reported on just as component traps may.

Attempts have been made to correlate performance and/or availability monitoring with component health monitoring. This is typically accomplished through a common user interface for viewing measurement data and through a common trap management and correlation interface for managing and handling traps. The performance and/or availability monitoring approach and the component health monitoring approach frequently operate independently; they are decoupled, or loosely coupled through trap correlation methods and data display methods. In both cases this approach often relies upon after-the-fact time correlation between performance and/or availability issues and component traps. By examining performance and/or availability problems and component health problems that occur near each other in time, operators may deduce some degree of causality between component health problems and performance and/or availability problems.

Another approach that may also be utilized is the use of a performance and/or availability monitor in conjunction with log file inspection. Instead of time correlating a service trap with component traps, component logs may be subsequently examined for anomalies occurring near the time of the performance and/or availability problem. This is time-correlation of decoupled data, where the collection of performance and/or availability status is not linked to the collection of log status until well after the component trap has occurred.

SUMMARY OF THE INVENTION

Embodiments of the present invention provide methods, systems and computer program products for collecting data processing system status information by monitoring network communications with the data processing system to observe transaction(s) associated with the data processing system. The transaction(s) is analyzed to determine if the transaction(s) complies with a quality standard and a trigger is generated based on the analysis of the transaction(s). System status information is collected responsive to the generation of the trigger.

In further embodiments of the present invention, the collection of system status information is provided by collecting system status information so that collection of the system status information automatically time correlates the collected system status information with the trigger.

In additional embodiments of the present invention, a plurality of network communications and monitored and respective ones of the plurality of network communications identified so as to establish network communications associated with the at least one transaction.

In yet other embodiments of the present invention, generating a trigger based on the analysis of the at least one transaction is provided by correlating a plurality of events associated with a transaction(s) to provide related events. A value associated with the related events is compared with a threshold value and a trigger is generated responsive to the value associated with the related events meeting the threshold value. The related events may also be weighted to provide weighted correlated events. In such a case, comparing a value associated with the related events with a threshold value may be provided by comparing a value of weighted correlated events with the threshold value. Furthermore, the generation of a trigger responsive to the number of correlated events meeting the threshold value may be provided by generating a trigger responsive to the value of the weighted correlated events meeting the threshold value.

In particular embodiments of the present invention, the correlated events are weighted based on at least one of a user identification associated with the plurality of transactions, transaction identity and/or an event class associated with a respective one of the plurality of events. The correlated events may also be weighted based on each of a user identification associated with the plurality of transactions, transaction identity and an event class associated with a respective one of the plurality of events.

In still further embodiments of the present invention, the quality standard is a quality associated with results of a function associated with the at least one transaction.

In yet other embodiments of the present invention, the collected system status information is stored along with information about the transaction that generated the trigger. The stored information and the stored collected system status information are associated with each other.

In additional embodiments of the present invention, analyzing the transaction(s) to determine if the transaction(s) comply with a quality standard is provided by analyzing content of the transaction(s) to determine if the transaction(s) complies with a quality standard associated with transaction content.

In further embodiments of the present invention, collecting system status information is provided by collecting initial system status information, evaluating the initial system status information to determine if additional system status information is to be collected and selectively collecting further system status information based on the evaluation of the status information.

In other embodiments of the present invention, methods, system and computer program products for collecting data processing system status information are provided by generating a trigger based on a measure of quality of content of transactions associated with the data processing system. System status information is collected responsive to generation of the trigger so that collection of the system status information automatically time correlates the collected system status information with the trigger.

Furthermore, the trigger may be generated by weighting events associated with one or more transactions based on at least one of a user identification associated with the plurality of transactions, transaction identity and/or an event class associated with respective ones of the events. The weighted events are compared to a measure of quality threshold and a trigger generated based on the comparison of the weighted events to the measure of quality threshold.

In further embodiments of the present invention, weighting events is provided by correlating events to provide a plurality of related events associated with the one or more transactions. The related events are weighted based on at least one of a user identification associated with the plurality of transactions, transaction identity and/or an event class associated with respective ones of the related events to provide weighted related events. The weighted related events are combined to provide an aggregate weighted value. The aggregate weighted value is compared to the measure of quality threshold and a trigger generated based on the comparison of the aggregate weighted value to the measure of quality threshold. Weighting the related events may also be based on each of a user identification associated with the plurality of transactions, transaction identity and an event class associated with respective ones of the related events to provide weighted related events.

Yet other embodiments of the present invention provide a system for collecting status information associated with a data processing system including a platform services circuit configured to generate a trigger based on monitoring network communications with the data processing system to observe at least one transaction associated with the data processing system and analyzing the at least one transaction to determine if the at least one transaction complies with a quality standard. An event services circuit is configured to collect status information responsive to receipt of the trigger generated by the platform services circuit.

Additional embodiments of the present invention provide a computer program product for collecting status information associated with a data processing system. The computer program product includes computer readable program code configured to generate a trigger based on monitoring network communications with the data processing system to observe at least one transaction associated with the data processing system and analyzing the at least one transaction to determine if the at least one transaction complies with a quality standard. Computer readable program code is also configured to collect status information responsive to generation of the trigger.

As will further be appreciated by those of skill in the art, while described above primarily with reference to method aspects, the present invention may be embodied as methods, apparatus/systems and/or computer program products.

DETAILED DESCRIPTION OF THE INVENTION

Figure 1:
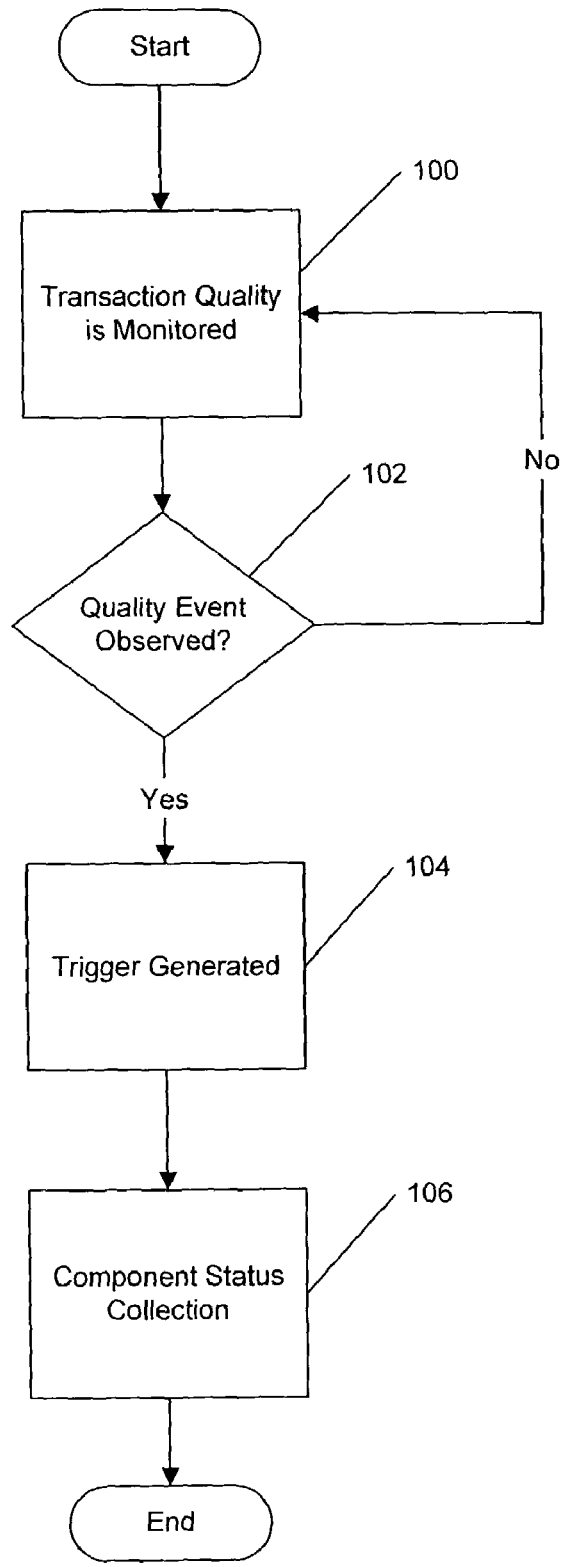
FIG. 1 is a flowchart illustrating operations for collecting data processing system status information according to embodiments of the present invention.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as methods, data processing systems, and/or computer program products. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Various embodiments of the present invention will now be described with reference to the figures. In the figures, like numbers refer to like elements throughout.

FIG. 1 is a flowchart illustrating operations for collecting data processing system status information according to embodiments of the present invention. As seen in FIG. 1, network communications with the data processing system are monitored to observe transactions associated with the data processing system 100. As used herein the term "transaction" refers to a series of related network communications that perform a function. For example, the retrieval of a web page may involve one or more transactions. The transactions are analyzed to determine if the transactions comply with a quality standard, and if non-compliance is observed, a quality event occurs 102. Thus, a quality standard may be related to the behavior of the transaction, the function provided by the transaction and/or the results of performing the function provided by the transaction. For example, if a web transaction is executed a transaction time-out may occur, which may cause the transaction to fail to meet a transaction behavior quality standard; an HTTP 500 response code may be returned indicating that the transaction function was not correctly executed, which may cause the transaction function to fail to meet a quality standard; and/or an HTTP 200 response code may be returned indicating that the function completed correctly, yet the content returned may be an error message instead of the requested content, which may cause the function result to fail to meet a quality standard. A trigger is generated based on the analysis of the transactions 104 and system status information is collected responsive to the generation of the trigger 106.

Embodiments of the present invention stem from the realization that the volume of service status information may be reduced and correlation of component status with transaction quality measures may be accomplished by causally linking the collection of component status to transaction quality events, and only collecting component status information when one or more transaction quality events have occurred or are occurring. Unlike after-the-fact correlation of service quality traps to component quality traps this approach does not rely on correlation rules being applied to effect service quality to component status mapping; the mapping is a result of the method itself. The volume of service status information may be further reduced by correlating like transaction service quality issues together and collecting component status information only when the correlated event is determined to be of such severity or scope that component status collection is desirable. Further, events may be prioritized based upon business rules such as the relative priority of the transaction, the relative priority of the transaction user, and/or the relative severity of the quality event or events observed, and collection of component status may be performed only when the priority of the correlated event meets a predefined threshold based on the application of business rules for priority and/or severity.

Figure 2:
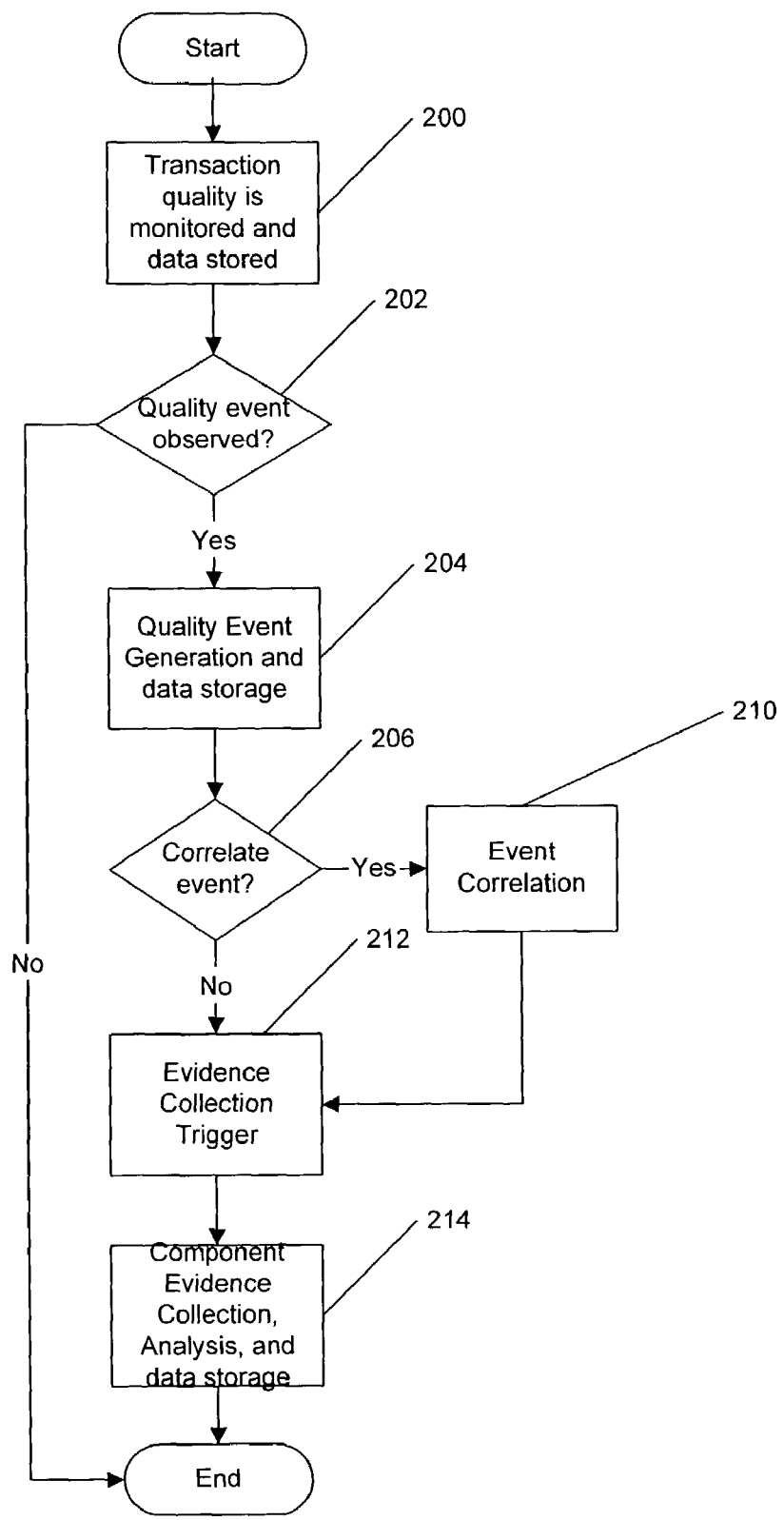
FIG. 2 is a flowchart illustrating operations for collecting and correlating data processing system status information according to further embodiments of the present invention.

FIG. 2 illustrates operations for collecting and correlating data processing system status information according to further embodiments of the present invention. Network communications with the data processing system are monitored to observe transactions associated with the data processing system 200. The transactions are analyzed to determine if the transactions comply with a quality standard 202. If the transactions do not comply with the quality standard 202, a quality event has occurred and an event message is generated based on the analysis of the transactions 204. If the event should be correlated with previous events 206, the event messages are correlated 210. In either case, a determination is made as to whether the event message or correlated event messages meet a condition and if so a trigger occurs and a status collection trigger message is generated based on the analysis of the transactions 212 and system status information is collected responsive to the generation of the trigger 214. Optionally, the data related to the quality event, trigger and system status is stored in a data memory and/or data storage system for further analysis and display.

Figure 3:
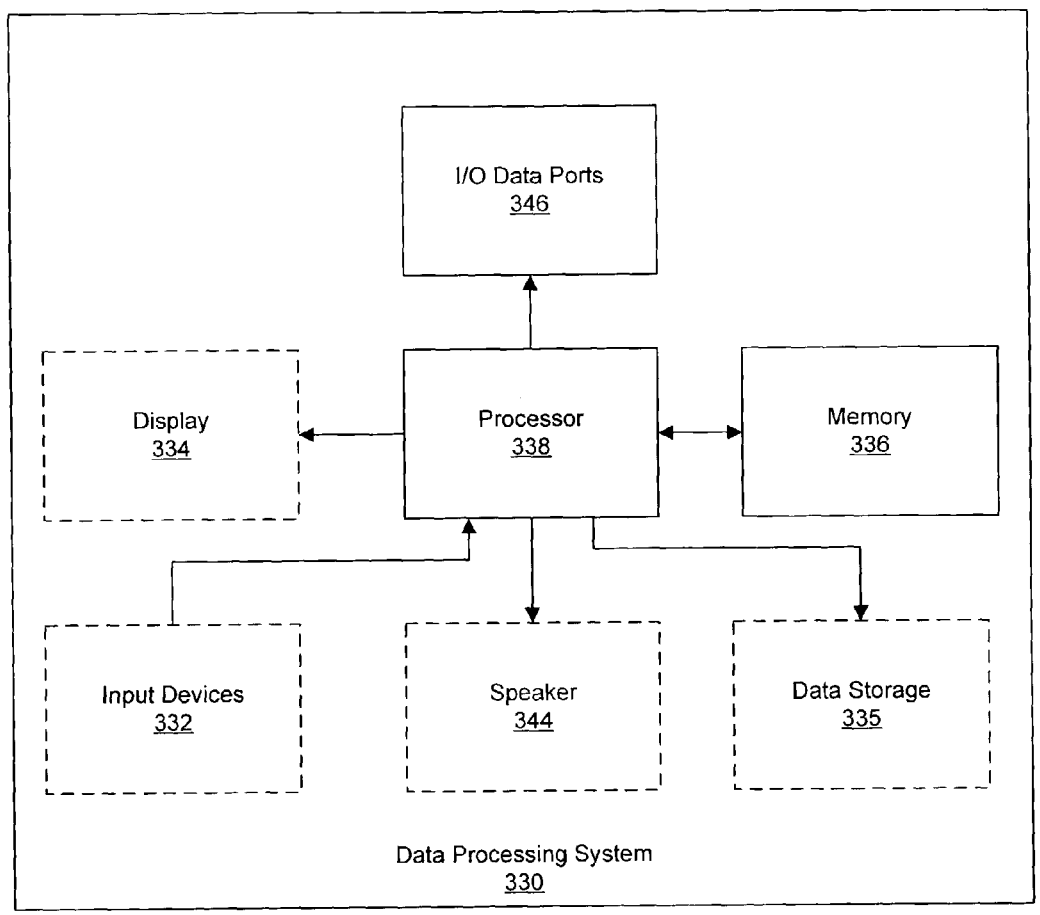
FIG. 3 is a block diagram of a data processing system suitable for use in embodiments of the present invention.

FIG. 3 illustrates an exemplary embodiment of a data processing system 330 suitable for a monitoring system and network traffic associated with the monitoring system in accordance with embodiments of the present invention. The data processing system 330 typically includes input device(s) 332 such as a keyboard or keypad, a display 334, and a memory 336 that communicate with a processor 338. The data processing system 330 may further include a speaker 344, I/O data port(s) 346, and data storage 335 that also communicates with the processor 338. The I/O data ports 346 can be used to transfer information between the data processing system 330 and another computer system or a network. These components may be conventional components, such as those used in many conventional data processing systems, which may be configured to operate as described herein.

Figure 4:
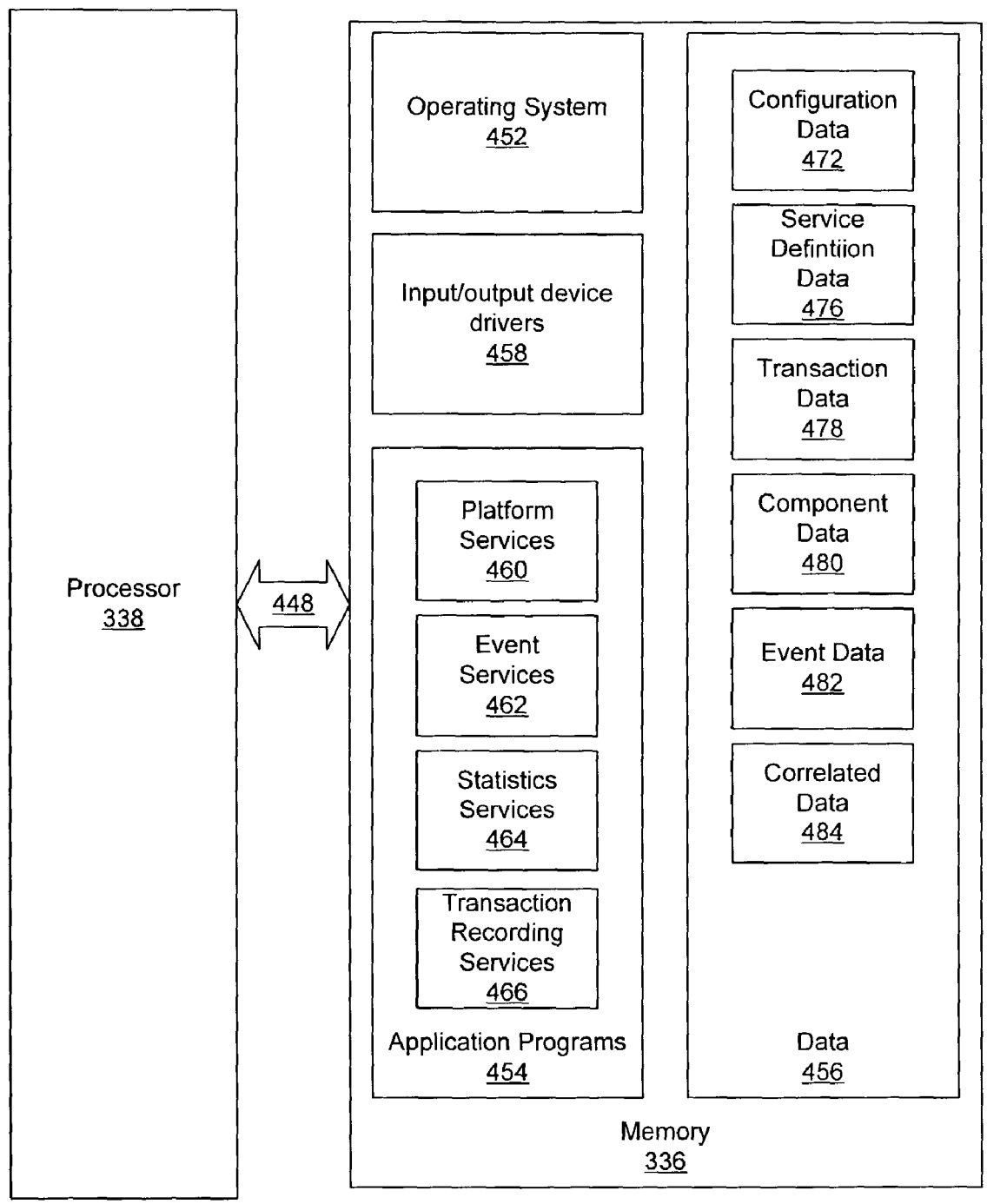
FIG. 4 is a more detailed block diagram of a data processing system according to embodiments of the present invention.

FIG. 4 is a block diagram of data processing systems that illustrates systems, methods, and computer program products in accordance with embodiments of the present invention. The processor 338 communicates with the memory 336 via an address/data bus 448. The processor 338 can be any commercially available or custom microprocessor. The memory 336 is representative of the overall hierarchy of memory devices containing the software and data used to implement the functionality of the data processing system 330. The memory 336 can include, but is not limited to, the following types of devices: cache, ROM, PROM, EPROM, EEPROM, flash memory, SRAM, and DRAM.

As shown in FIG. 4, the memory 336 may include several categories of software and data used in the data processing system 330: the operating system 452; the application programs 454; the input/output (I/O) device drivers 458; and the data 456. As will be appreciated by those of skill in the art, the operating system 452 may be any operating system suitable for use with a data processing system, such as OS/2, AIX or System390 from International Business Machines Corporation, Armonk, N.Y., Windows95, Windows98, Windows2000 or WindowsXP from Microsoft Corporation, Redmond, Wash., Unix or Linux. The I/O device drivers 458 typically include software routines accessed through the operating system 452 by the application programs 454 to communicate with devices such as the I/O data port(s) 346, the data storage 335 and certain memory 336 components. The application programs 354 are illustrative of the programs that implement the various features of the data processing system 330 and preferably include at least one application which supports operations according to embodiments of the present invention. Finally, the data 456 represents the static and dynamic data used by the application programs 454, the operating system 452, the I/O device drivers 358, and other software programs that may reside in the memory 336.

As is further seen in FIG. 4, the application programs 454 may include a platform services module 460, an event services module 462, a statistics services module 464, and/or a transaction recording services module 466, among other modules. For example, the platform services module 460 may carry out the operations described herein for packet filtering and decryption, user identification and attribute binding, session identification and attribute binding, transaction state management and meta-transaction binding, transaction identification and attribute binding, transaction analysis and event generation, transaction correlation and trigger generation, transaction event weighting, and/or implementation of a statistics service interface, among other operations, as is described in more detail in reference to FIG. 5.

Figure 13:
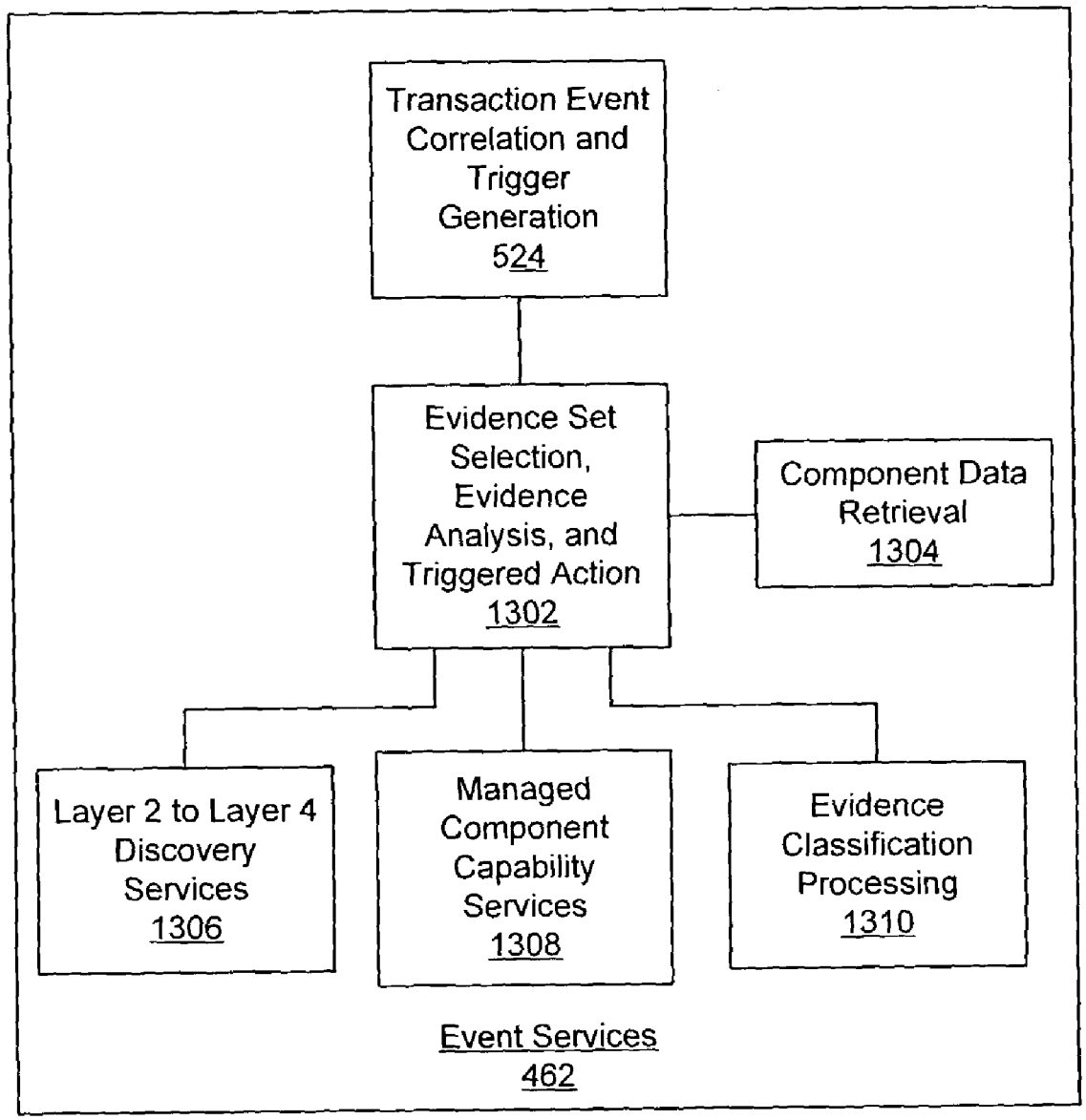
FIG. 13 is a block diagram of an event services module according to particular embodiments of the present invention.

The event services module 462 may carry out the operations described herein for layer 2 to layer 4 discovery services, managed component capability services, evidence classification processing, evidence set selection, evidence analysis, and triggered action, and/or component data retrieval, among other operations, as is described in more detail in reference to FIG. 13.

The statistics services module 464 may carry out the operations for processing, recording, analyzing, correlating, summarizing, and storing transaction quality statistics such as performance, availability, utilization, and content quality statistics for monitored transactions, for example, statistics related to transaction time, transaction size, transaction throughput, transaction availability, transaction yield, transaction defect count, and/or transaction defects per million opportunities, among other operations. These transaction statistics may be correlated, grouped and/or summarized, for example, by user group, location, department, transaction class, defect type, service, business process, application, time of day, day of week, month, quarter, and/or year, among others. A representation of the distribution of the data may be stored with the data that may enable an operator to detect and/or predict further quality issues. For example, percentile data for the distribution of transaction times, where the $25^{th}$, $50^{th}$, and $75^{th}$ percentiles for the distribution of transaction times may be presented, among others.

The transaction recording services 466 may carry out the operations for capturing, processing, recording, analyzing, correlating, summarizing, and storing transaction packet data, among other operations. The transaction recording services 466 may be initiated manually and/or may be initiated automatically, for example, upon detection of a transaction previously identified as one to be monitored. When the transaction recording services are in operation a packet buffer may be allocated and packets for analysis placed in this buffer. If a transaction to be monitored is detected, for example, some or all of the packets related to that transaction, including those packets placed in the buffer prior to the identification of the transaction, may be stored for further processing. A transaction may be identified as a transaction to be monitored, for example, by the detection of an error condition, by association with a particular user or user class, by transaction identity, and/or by a calculated transaction priority, among other identification methods.

The data portion 456 of memory 336, as shown in the embodiments of FIG. 4, may, optionally, include a configuration data section 472, a service definition data section 476, a transaction data section 478, a component data section 480, an event data section 482, and/or a correlated data section 484, among other sections. The configuration data section 472 may be utilized by application programs 454 to provide configuration parameters, configured thresholds, and/or configuration rules related to the transactions being monitored, among other data. For example, the transaction identification rules for the transactions being monitored, the thresholds for quality events, the weights for prioritization of transactions, users, and events, the rules for identifying users and sessions, the rules for binding transactions to users and sessions, the rules for binding transactions to meta-transactions, the rules for component agent and agent capabilities discovery, the rules for layer 2 to layer 4 discovery, and/or the configuration parameters for accessing component agents may be provided in this memory section.

The service definition data section 476 may be utilized by application programs 454 to provide data about the services and the components related to them, among other data. For example, a "business process", a type of service used to automate one or more steps in a manual process used to conduct business, may be implemented in a distributed computing system comprised of a number of hardware and software components, including client systems and software, network systems and software, and/or server systems and software, among others. One use of the service definition data, among others, may be to provide a mapping of these hardware and software components to the business process for which transactions are monitored, and/or a mapping of these components to management agents capable of monitoring the status of some or all of these components.

The transaction data section 478 may be utilized by application programs 454 to provide transaction quality statistics for monitored transactions, for example, performance, availability, utilization, and content quality statistics, including statistics related to transaction time, transaction size, transaction throughput, transaction availability, transaction opportunities, and/or transaction defects, among other data.

The component data section 480 may be utilized by application programs 454 to provide status information about monitored components, for example, memory utilization, CPU utilization, storage system utilization, I/O port utilization, hardware configuration data, software configuration data, software components in memory, software components running, network connection status, software port connection status and configuration, software virtual machine status and configuration, and/or software sub-component status and configuration, among other data for components such as workstations, servers, routers, switches, application programs, middleware programs, and database programs.

The event data section 482 may be utilized by application programs 454 to provide information about transaction quality events, for example, information about the user or user group related to a transaction, the class of transaction, the event class related to the transaction, priority weights related to the transaction, and/or time of occurrence of the event, among other data.

The correlated data section 484 may be utilized by application programs 454 to provide relationship information between configuration data, transaction data, component data, and/or event data, among other data. For example, if a user executing a transaction related to a business process experienced a quality event an event may be generated and this event data may be correlated with other event data generated as the result of other transaction quality events, with status data about the components related to the transaction or transactions, and/or with configuration data about the quality standards including performance thresholds in force at the time of the event.

While the present invention is illustrated, for example, with reference to the platform services module 460, the event service module 462, the statistics services module 464, and/or the transaction recording services module 466 being a application programs in FIG. 4, as will be appreciated by those of skill in the art, other configurations may also be utilized while still benefiting from the teachings of the present invention. For example, the platform services module 460 may also be incorporated into the operating system 452, the I/O device drivers 458 or other such logical division of the data processing system 330. Thus, the present invention should not be construed as limited to the configuration of FIG. 4 but is intended to encompass any configuration capable of carrying out the operations described herein.

Figure 5:
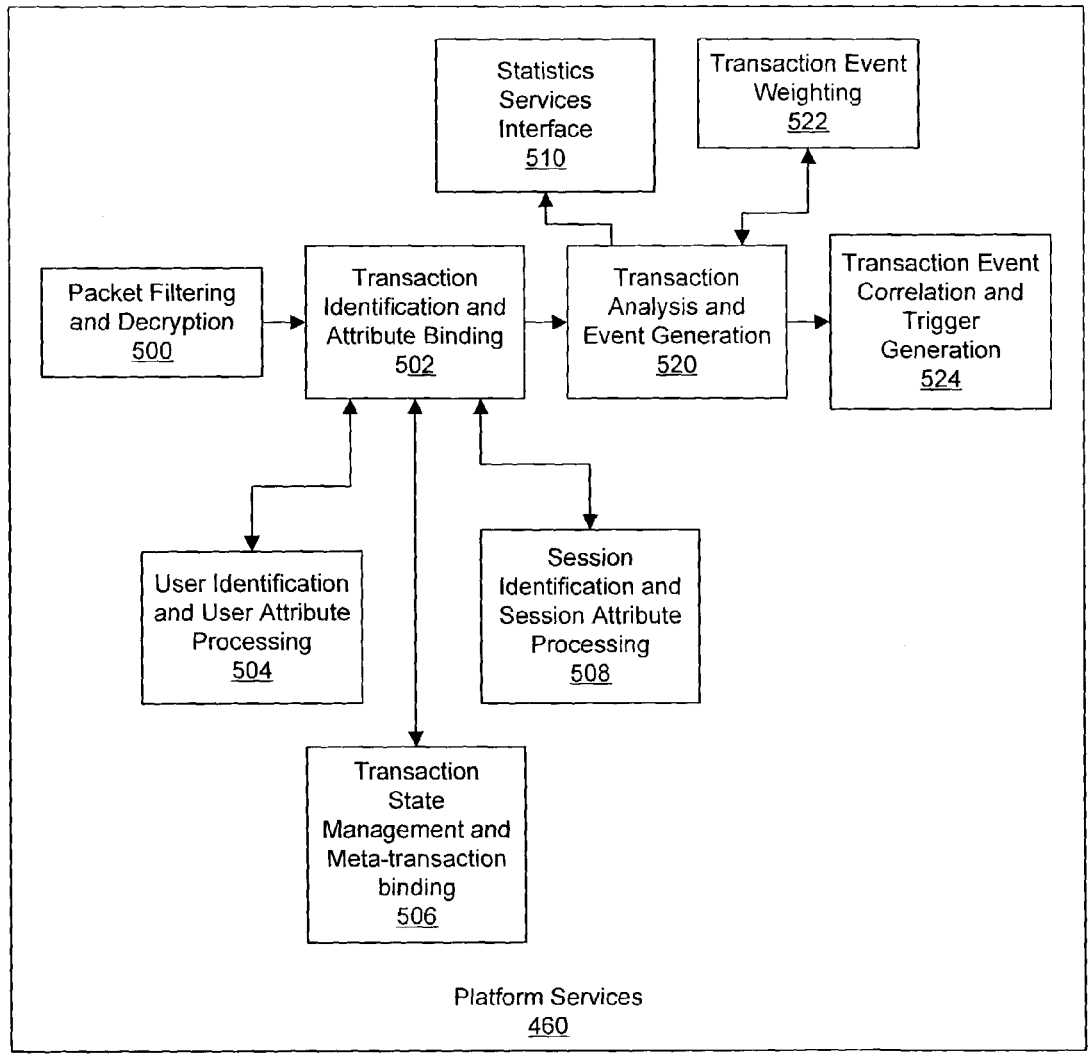
FIG. 5 is a block diagram for a platform services module according to particular embodiments of the present invention.

FIG. 5 is a block diagram for a platform services module according to particular embodiments of the present invention.

Network traffic is received by the packet filtering and decryption module 500, where all traffic which is not to be processed is dropped, and all traffic to be processed is retained. Network packets may be received from a mirrored port on a data center switch, for example. Packets may be optionally decrypted and/or decompressed prior to being forwarded to the transaction identification and attribute binding module 502. The transaction identification and attribute binding module 502 receives the forwarded packets, assembles packets into flows, and parses flows for transactions. Transactions are then forwarded to the transaction analysis and event generation module 520 where transactions are analyzed for compliance to predefined quality standards. Quality standards may be applied to transaction attributes such as performance, availability, and/or utilization as well as to transaction content. For example, the time required to complete a transaction may be compared to a predefined quality standard of 8 seconds or less, and/or the content of the transaction may be examined to determine if it contains the predefined text string "Error Message #1234", where existence of this text string indicates that the transaction does not meet content quality standards. When a quality event occurs, sometimes referred to as a "defect", an event message is generated and forwarded to the transaction event correlation and trigger generation module 524. The transaction event correlation and trigger generation module 524 receives the event message and correlates it with other like event messages in order to assess the aggregate impact on service quality and to reduce the volume of service quality and component status information presented to an operator. The correlated event information is analyzed and when a predefined service quality threshold is met a trigger is generated and a status collection trigger message sent. Unlike an event message or a trap used to communicate a status collection trigger message initiates subsequent action. This status collection trigger message is forwarded to the event services module 462, specifically to the evidence set selection, evidence analysis, and triggered action module 1302 as described in reference to FIG. 13. The evidence set selection, evidence analysis, and triggered action module 1302 receives the status collection trigger message and acts upon it, using the status collection trigger message to initiate the collection of system status information from one or more hardware and/or software components in the distributed computing system. Thus, a measure of transaction quality resulting from the analysis of network packets may be used to collect a snapshot in time of the status of individual components and the state of the components as an aggregate at the time of the transaction quality event.

FIG. 5 additionally illustrates a number of supporting modules. The transaction weighting module 522 enables the weighting of event messages to give priority to more important or critical event messages thus providing differentiation between classes of transaction quality events. The session identification and session attribute processing module 508 enables the association of a session identifier with a transaction in order to facilitate the binding of user identity to transactions and the binding of transaction together into meta-transactions. The transaction state management and meta-transaction module 506 enables the binding of transactions into meta-transactions thus allowing multiple transactions to be treated as a single transaction for purposes of quality evaluation. The user identification and user attribute processing module 504 enables the binding of user identity to transactions thus enabling differentiated treatment of transactions based upon user identity. The statistics services interface module 510 provides an interface to the statistics services module 464.

FIG. 5 refers to the software modules used to perform the functions of the platform services module 460. The packet filtering and decryption module 500 carries out the operations described herein for receiving packets and dropping all packets not to be processed further. For example, if only web application traffic is to be analyzed, all non-HTTP and non-HTTPS traffic may be dropped. Additional filters based on specified network addresses and/or software port numbers, for example, may be applied to further limit the traffic analyzed. Any encrypted traffic passing the pre-filtering stage may be decrypted, for example decryption of SSL traffic for web applications as accomplished in the ssldump open source software. Compressed traffic, for example gzip compressed traffic for web applications, may be uncompressed.

Clear-text packets may be forwarded to transaction identification and attribute binding module 502.

Figure 6:
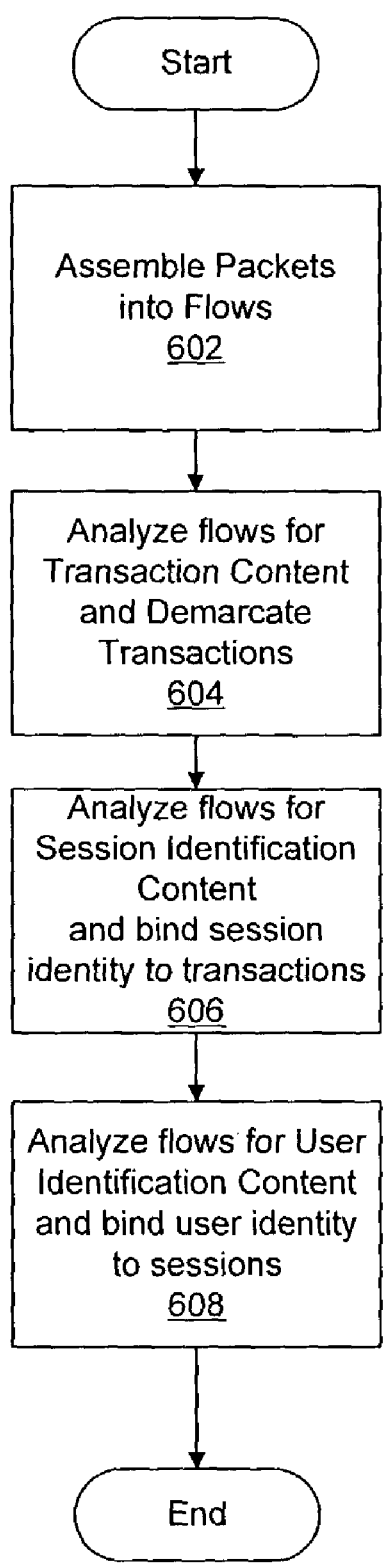
FIG. 6 is a flowchart illustrating operations for transaction identification and attribute binding according to particular embodiments of the present invention.

The transaction analysis and attribute binding module 502 carries out the operations described herein for assembly of packets into flows, analysis of flows for transaction content and demarcation of transaction components, analysis of flows for session identification content and binding of session identity to transaction components, and/or analysis of flows for user identification content and binding of user identity to sessions, as is described in more detail in reference to FIG. 6.

The transaction state management and meta-transaction binding module 506 carries out the operations described herein for relating transaction components to transactions and/or for relating transactions to meta-transactions, sometimes referred to as "business transactions". For example, in a web application, a transaction component may be the retrieval of an image file displayed on a web page, a transaction may be the retrieval of a single web page, and/or a business transaction may be a series of web pages that taken together automate some useful task. A transaction may be composed of one or more transaction components. In some instances, a transaction component may itself be a transaction and require no component-to-transaction binding, for example, where a web page transaction contains no additional components, or where additional components exist but are not defined as part of the transaction. Binding may be accomplished through a simple table lookup, where a list of transaction components is related to a transaction, for example. Another example of a binding mechanism may be through such a list used in conjunction with a session identifier, where only transactions or transaction components sharing a common session identifier may be bound together.

The session identification and session attribute processing module 508 carries out the operations described herein for relating a session identifier to one or more transactions. For example, in a web application, a session identifier may be carried in the packet data stream as a cookie in every packet. The session identifier in the packets related to the transaction may be related to the transaction itself. A single session identifier may be bound to one or more transactions. Session attributes, for example, session priority, may be associated with transactions through this session-to-transaction binding mechanism.

The user identification and user attribute processing module 504 carries out the operations described herein for relating a user identity to transactions. The user identification and user attribute processing module 504 may identify and associate a user identifier with a session by examining and parsing the login transaction for user identity information, for example. In those cases where the login transaction possesses a session identifier, for example, this session identifier may be used to establish a relationship between the user identifier and the session identifier, which may in turn share a relationship with one or more transactions. Another example of user to transaction binding is through the intermediary of a network address, for example where the IP source address of the packets related to the transaction is used to look up user identity in a table of IP address to user identity relationships. User attributes, for example, user priority, user location, user access rights, user organization, and/or user group, among other user attributes may be associated with sessions and/or transactions through this user to session binding mechanism and through the user-to-session-to-transaction binding mechanism. User attributes may be retrieved from an external system, for example, by using user identity information to look up user attributes in an X.500 directory, a LDAP directory, and/or a single sign-on system.

The transaction analysis and event generation module 520 carries out the operations described herein for analyzing transactions for transaction quality including availability, performance, utilization, and content quality events and generating an event when appropriate. Information about, characteristics of, and/or the content of transactions identified in the transaction identification module 502 are measured against a set of pre-defined standards. Event behavior analysis, event content analysis, and/or event validity analysis are performed and events may be generated and event messages created when specific conditions are met and/or certain thresholds are exceeded among other operations, as is described in more detail in reference to FIG. 7.

Event messages created may carry with them a set of priority weights which may be calculated in the transaction event weighting module 522. The transaction event weighting module 522 carries out the operations described herein for applying priority weights to event messages based upon the transaction identity, the user identity, and/or the event class identity related to the event as is described in more detail in reference to FIG. 11. These weights for an event message may be combined so that decisions about the priority of an event may be made based upon the weights individually and/or in combination.

The statistics service interface module 510 carries out the operations described herein for receiving transaction quality statistics including availability, performance, utilization, and/or content quality statistics from the transaction analysis and event generation module 520 and making this information available to other modules. Subsequent modules may retrieve and process this data to carry out operations for processing, recording, analyzing, correlating, summarizing, and storing performance, availability, utilization, and quality statistics for monitored transactions, for example, statistics related to transaction time, transaction size, transaction throughput, transaction availability, transaction yield, transaction defect count, and/or transaction defects per million opportunities, among other operations. The data provided by the statistics service interface module 510 may include a representation of the distribution of the data, for example, percentile data for the distribution of transaction times, where the $25^{th}$, $50^{th}$, and $75^{th}$ percentiles for the distribution of transaction times may be presented, among others.

Figure 12:
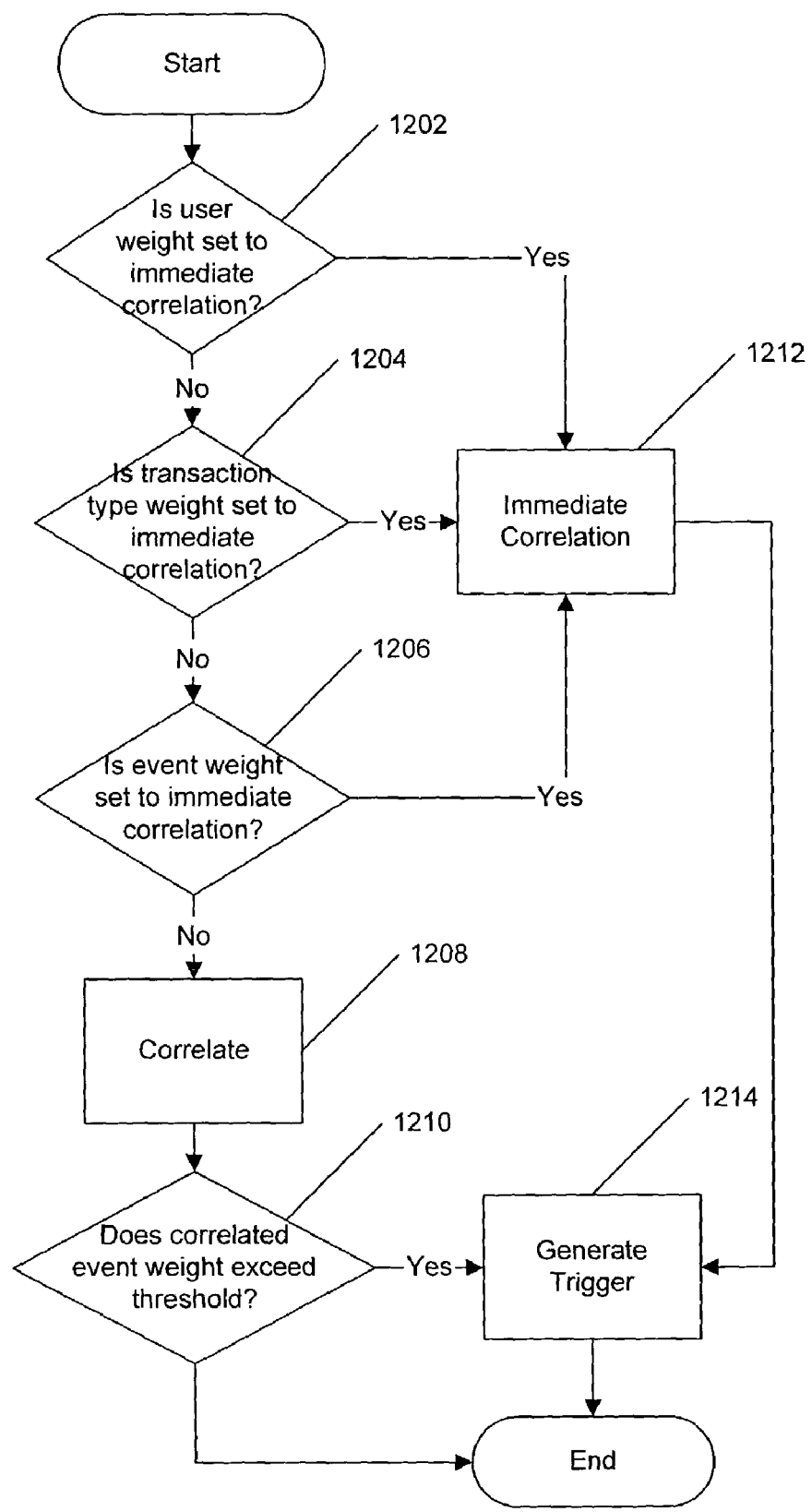
FIG. 12 is a flowchart illustrating operations for transaction event correlation and trigger generation according to particular embodiments of the present invention.

The transaction event correlation and trigger generation module 524 carries out the operations described herein for evaluating user event weights, evaluating transaction event weights, evaluating event class weights, performing immediate correlation and correlation, evaluating correlated event weight thresholds, and generating component status collection trigger messages, as is described in more detail in reference to FIG. 12.

Operations according to embodiments of the present invention will now be described with reference to the flowcharts and/or block diagrams of FIGS. 6 through 14.

FIG. 6 is a flow chart illustrating operations of the transaction identification and attribute binding module 502 according to particular embodiments of the present invention. As seen in FIG. 6, packets are assembled into "flows" 602, where a flow is defined as a unidirectional stream of packets between a given source and destination, for example, in IP networks where the source and destination are both defined by network-layer IP addresses and transport-layer source and destination port numbers. Additional flow identifiers may be optionally included to further characterize a flow, for example, Layer 3 protocol type, ToS byte, and/or input logical interface (ifIndex) for IP network flows. Packets sharing these identifiers may be considered associated with the specific flow and may be analyzed in packet order as a flow. A related bidirectional pair of flows may be referred to as a "connection". A related set of one or more connections may be referred to as a "session". Flows, connections, and sessions may be associated with one or more transactions. A transaction may include a request flow, from a source to a destination, and a response flow, from a destination to the requestor source.

The request flow, the response flow, or both are parsed for transaction content and the beginning and end of transactions demarcated 604. For example, for web applications, a transaction may be demarcated as an HTTP request/response pair as specified in IETF RFC 2616. Flows may be analyzed for session identification content 606, for example as specified in IETF RFC 2109 for web applications, and bound to transactions. A data structure consisting of a session-id and transaction-id pair, for example, is sufficient to facilitate this binding. If user identity information is available in the data stream and session identity information is available in the data stream this user identity information may be bound to the session identity for the duration of the session 608. User identity may be carried in the data stream on a packet-by-packet basis and extracted from these packets, for example where a user identity cookie is carried in the HTTP header for a web application. In some instances user identity may not be carried in every packet, but may be associated with a session, for example when a user executes a login transaction. In such cases user identity may be extracted from the login transaction content, for example when the user identity is carried in an HTTP POST field. User identity may be subsequently bound to the session associated with the flow or flows at that time, or at any time thereafter when a session identity becomes associated with the flow or flows. A data structure consisting of a session-id to user-id binding may be further associated with a session-id to transaction-id binding so that the user-id may thus be bound to one or more transactions associated with the session-id. Finally, a user identity may be bound directly to a flow or flows and/or a connection without the intermediary of the session-id, for example, in the case where the user-id is associated with a connection-id and all transactions associated with that connection-id.

Figure 7:
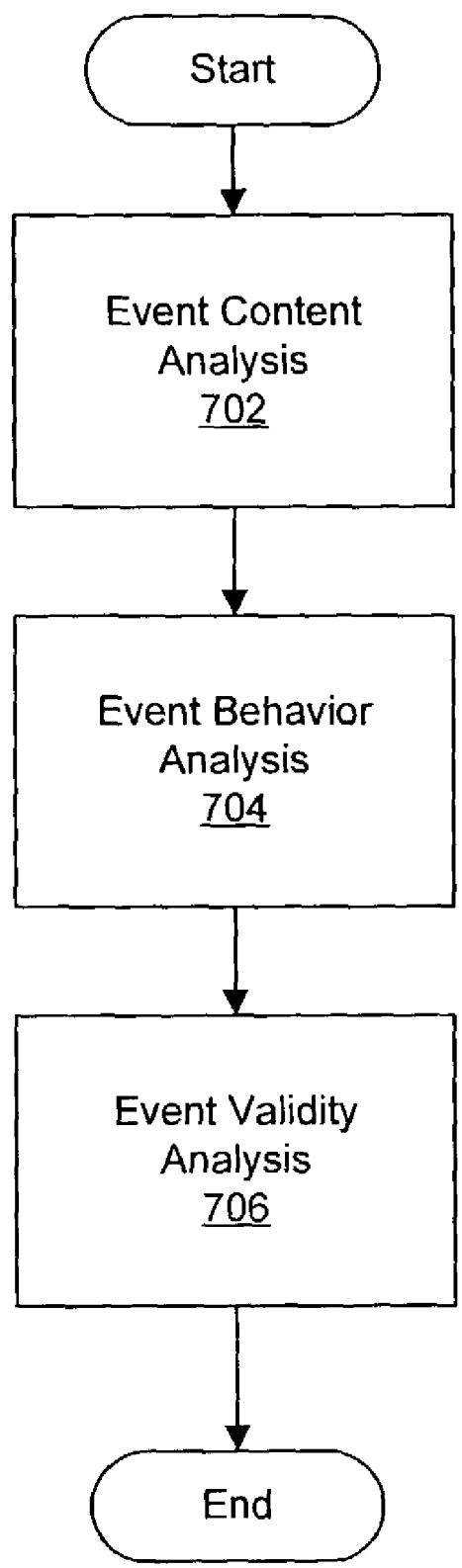
FIG. 7 is a flowchart illustrating operations for transaction analysis and event generation according to particular embodiments of the present invention.

FIG. 7 is a flow chart illustrating operations of the transaction analysis and event generation module 520 according to particular embodiments of the present invention. As seen in FIG. 7, event content analysis is performed 702 to parse transaction content for event signatures and generate a content event when an event signature is found as described in more detail in reference to FIG. 8. Event behavior analysis is performed 704 to compare transaction behavior to event specifications and generate a behavior event when a behavior specification is not met as described in more detail in reference to FIG. 9. Event validity analysis is performed 706 to parse transaction content for validity fields, perform validity checks and calculations, and generate a validity event when a validity check fails as is described in more detail in reference to FIG. 10, among other operations.

Figure 8:
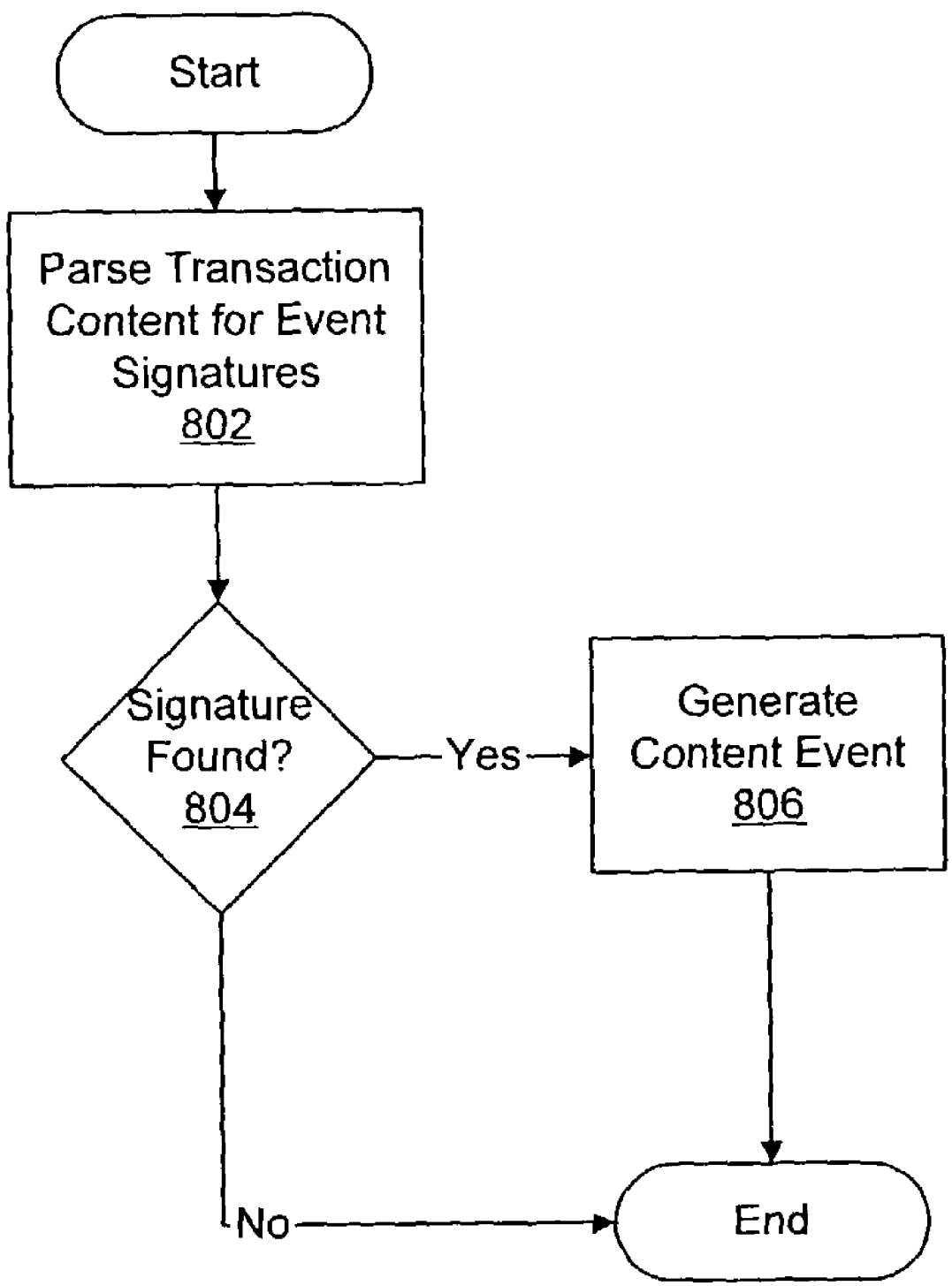
FIG. 8 is a flowchart illustrating operations for event content analysis according to particular embodiments of the present invention.

FIG. 8 is a flow chart illustrating operations of the transaction analysis and event generation module 520 according to particular embodiments of the present invention. As seen in FIG. 8, event content analysis is performed 702 to parse transaction content for event signatures 802. Event signatures may include, for example, the existence or nonexistence of byte patterns, including explicit character strings, byte patterns as specified in regular expression notation, and/or byte patterns that include explicit character strings with prefix or postfix wildcard character masks. Transaction request and/or transaction response content may be examined for the occurrence or nonoccurrence of these event signatures, and upon a pattern match 804, generate a content event 806. Upon generation of an event an event message may be created. Information in the event message may be used in subsequent processing. For example, transaction response content may be examined for the occurrence of the pattern "ODBC driver failure", and upon match generate a content event where the event message may carry with it the pattern that was matched along with additional information about the transaction, including the transaction-id, transaction user-id, source system address, destination system address, event time, and/or event-id, among other event information.

Figure 9:
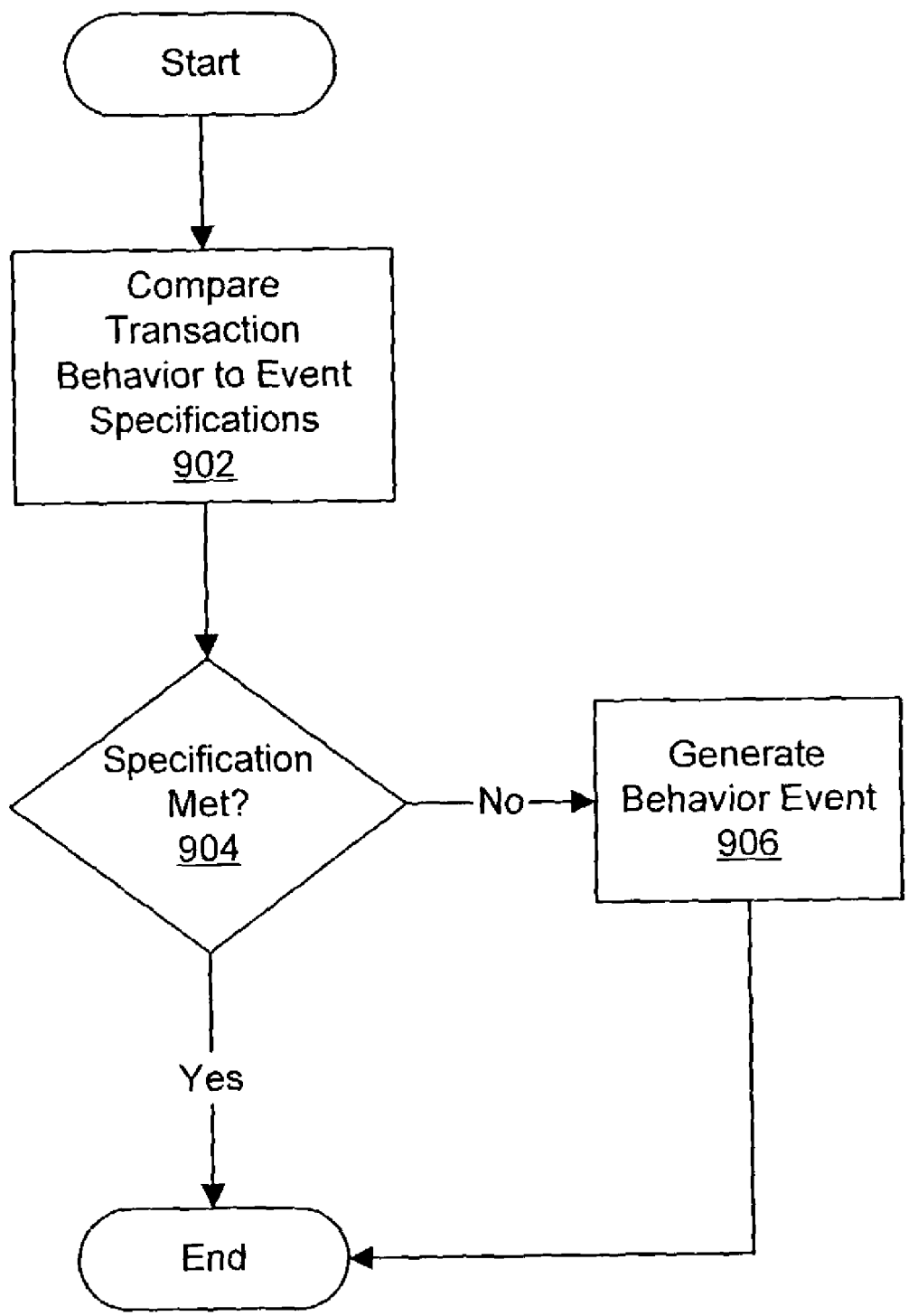
FIG. 9 is a flowchart illustrating operations for event behavior analysis according to particular embodiments of the present invention.

FIG. 9 is a flow chart illustrating operations of the transaction analysis and event generation module 520 according to particular embodiments of the present invention. As seen in FIG. 9, event behavior analysis is performed 704 to compare transaction behavior to event specifications 902. Transaction behavior may include, for example transaction success or failure, transaction timeout occurrence, transaction time, transaction size, transaction throughput, and/or transaction time breakdown into client time, network time, and server time, among other behavior. Transaction behavior is measured and/or observed. Transaction behavior may be compared to standards of behavior, referred to as "specification limits" and/or "service level agreements". When observed and/or measured behavior may be found to deviate from acceptable specification limits by a pre-defined unacceptable amount the behavior specification may be determined to have not been met 904 and a behavior event generated 906. Upon generation of an event an event message may be created. Information in the event message may be used in subsequent processing. The behavior event message may carry with it the specification that was not met and/or the value or occurrence that caused the specification to not be met, along with additional information about the transaction, including the transaction-id, transaction user-id, source system address, destination system address, event time, and/or event-id, among other information.

Figure 10:
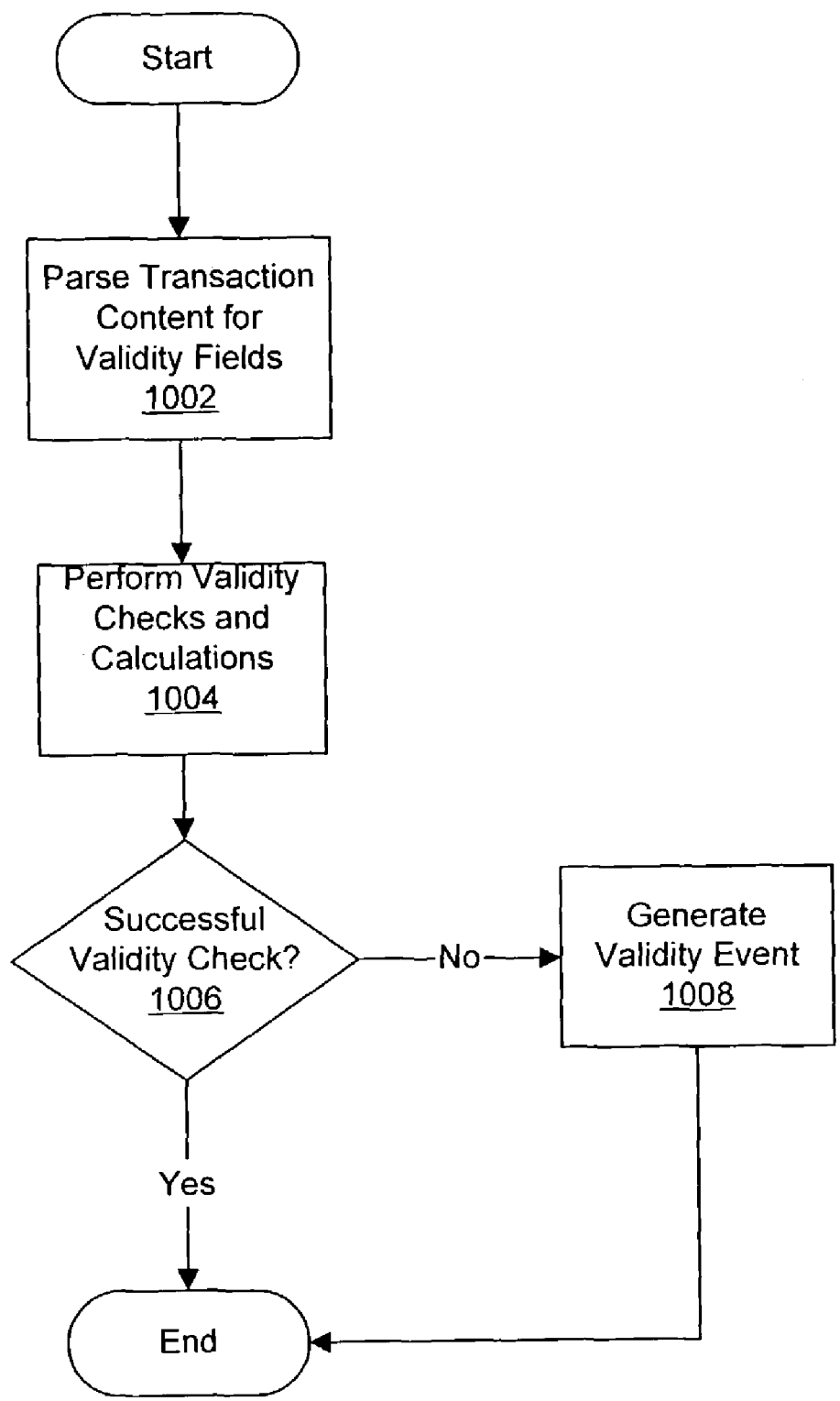
FIG. 10 is a flowchart illustrating operations for event validity analysis according to particular embodiments of the present invention.

FIG. 10 is a flow chart illustrating operations of the transaction analysis and event generation module 520 according to particular embodiments of the present invention. As seen in FIG. 10, event validity analysis 706 is performed to parse transaction content for validity fields 1002. Content validity fields may be byte patterns, such as attribute/value pairs in an XML transaction, or POST field HTML tags and their associated values in a web page, for example. The values of these validity fields may be evaluated and checked for validity 1004. For example, an account balance field may be examined to determine if it contained numeric data; an item count field may be examined to determine if it contains a non-negative integer value; or a country code may be examined to determine if it contains a valid data pattern. Furthermore, validity fields may have operations performed against them such as mathematical calculations, for example where a validity field containing a unit price value and a validity field containing a quantity value are multiplied together and the result compared to a validity field containing an extended price value. When the evaluation of the validity check returns a value indicating that the validity check failed 1006 a validity event is generated 1008. Upon generation of an event an event message may be created. Information in the event message may be used in subsequent processing. For example, the event message may carry with it the value or values of the validity field or fields evaluated when the test failed, the operation or operations performed on the validity fields to evaluate compliance, any resulting values calculated or produced as a result of the evaluation operation or operations, along with additional information about the transaction, including the transaction-id, transaction user-id, source system address, destination system address, event time, and/or event-id, among other information.

Figure 11:
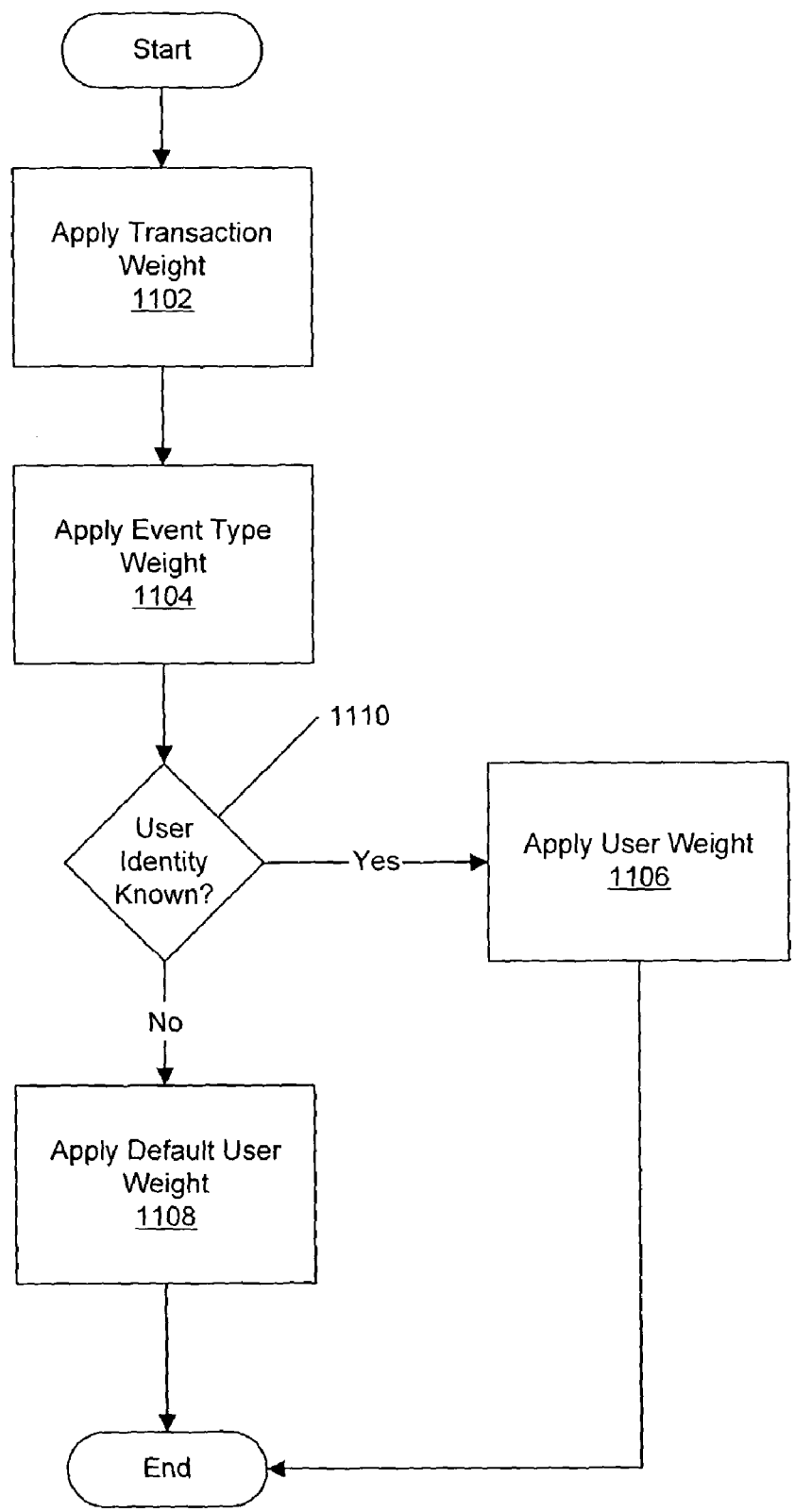
FIG. 11 is a flowchart illustrating operations for transaction event weighting according to particular embodiments of the present invention.

FIG. 11 is a flow chart illustrating operations of the transaction event weighting module 522 according to particular embodiments of the present invention. As seen in FIG. 11, priority weights are applied to events based upon the transaction identity 1102, the user identity 1106, and/or the event class identity 1104, among others. Event weights may be absolute weights, for example, where a weight may be a dollar amount associated with a transaction generating an event, or they may be relative weights, for example, where transaction weights are integer numbers indicating relative priority among transaction events. Particular embodiments of event weighting specifies that weights may be integers between 0 and 7, where weight values of 0 and 7 are treated as special values during transaction event correlation and trigger generation 524. Application of a transaction weight 1102 may be based on a table mapping, where the transaction-id has associated with a pre-configured weight, for example where the transaction weight of 4 is associated with transaction-id 1. Application of an event-class weight 1104 may be based on a table mapping, where the event-class-id has associated with it a pre-configured weight, for example where the event weight of 3 is associated with event-class-id 2. An event-class is a class of events composed of all events that match a pre-defined event definition, for example in a web-based application, a content event where an HTTP response code of 500 was returned may be defined as an event-class. Likewise, a behavior event of low transaction throughput may be defined as an event-class. All instances of events may evaluate to an event class, and thus an event weight may be applied to all events. An event may be evaluated to determine if it has user identity associated with it 1110. If the event does not have user identity associated with it then a predefined default user weight may be applied to the event 1108. If the event does have user identity associated with it then application of a user weight 1106 may be based upon a table mapping, where the user-id has associated with it a pre-configured weight, for example where the event weight of 2 is associated with a user-id of 3. User identity may be associated with a single user or with a user class, so that a weight may be indicative of the priority of an individual, or it may be indicative of the priority of a user class, for example premier customers, or senior executives, or other user class or group. A combined weight for the transaction may be calculated, for example by multiplying the transaction weight, the user weight, and the event class weights together. This combined weight may be applied to an event message and carried in the event message for use in subsequent calculations.

FIG. 12 is a flow chart illustrating operations of the transaction event correlation and trigger generation module 524 according to particular embodiments of the present invention. As seen in FIG. 12, the transaction event correlation and trigger generation module 524 may perform operations for evaluating user event weights 1202, evaluating transaction event weights 1204, evaluating event class weights 1206, performing immediate correlation 1212 and correlation 1208, evaluating correlated event weight thresholds 1210, and generating component status collection trigger messages 1214, among other operations. One embodiment of event weighting specifies that weights may be integers between 0 and 7, where weight values of 0 and 7 are treated as special values. When an event has a combined weight of 0 it may be discarded. When one or more of the user priority, transaction priority, or event class priority has a weight of 7 the event may be immediately correlated. Event messages may be processed and weights evaluated. The user weight may be evaluated to determine if immediate correlation is required 1202 and if so immediate correlation 1212 takes place. The transaction weight may be evaluated to determine if immediate correlation is required 1204 and if so immediate correlation 1212 takes place. The event class weight may be evaluated to determine if immediate correlation is required 1206 and if so immediate correlation 1212 takes place. When immediate correlation takes place 1212 a new correlated event may be created using information from the event message being evaluated, including the event combined weight, event generation time, the event transaction, the event class, and/or a user count initialized to 1, among other information. Lists of correlated events, correlated users, and/or correlated event classes may be created and bound to the correlated event. In the case of an immediate correlation event only the event being evaluated may be added to the correlated lists. The occurrence of an immediate correlation event creates a correlated event message which may be sent immediately to the generate trigger step 1214. If no immediate correlation is indicated then correlation may take place 1208. The combined event weight is calculated, where one method of calculation is to multiply the user weight, the transaction weight, and the event class weight together. If the value of this combined weight is 0 the event may be discarded, or logged and discarded. Events may be correlated by transaction, by user, and/or by event class.

For example, if events are to be correlated by transaction and event class pair the correlation module 1208 may check to see if an existing correlated event exists for the transaction and event class pair associated with the event. If no correlated event exists a new correlated event may be created using information from the event being evaluated, including the event combined weight, the event generation time, the event transaction, the event class, and/or a user count initialized to 1, among other information. The creation of a correlated event does not automatically create a correlated event message. Lists of correlated events, correlated users, and/or correlated event classes may be created and bound to the correlated event. If a correlated event for the transaction and event class pair exists then information from the event being evaluated may be added to the existing correlated event, including adding the event combined weight to the correlated event combined weight, incrementing the event count, and/or incrementing the user count if applicable, among other information. The lists of correlated events, correlated users, and/or correlated event classes is updated to include information from the event being evaluated. The correlated event combined weight may be compared to a pre-defined trigger threshold weight, and if the value of the correlated event combined weight is equal to or greater than the trigger threshold weight the correlated event may create a correlated event message which may be sent immediately to the generate trigger step 1214 where a status collection trigger message may be generated. This status collection trigger message carries with it information used in subsequent operations including source network addresses, destination network addresses, event class information, user identity information, transaction identity information, and event detail information, along with other information.

FIG. 13 is a block diagram of an event services module 462 according to particular embodiments of the present invention. FIG. 13 refers to the software modules which may be used to perform some or all of the functions of the event services module 462. The status collection trigger message generated by the correlated trigger operations 1214 of the transaction event correlation and trigger generation module 524 provides an interface between the platform services module 460 and the event services module 462. A number of supporting service modules including the layer 2 to layer 4 discovery services module 1306, the managed component capability services module 1308, and the evidence classification processing module 1310 may reduce configuration tasks and classify component status data into a structured set of data. The layer 2 to layer 4 discovery services module 1306 may be used to discover layer 2 components, layer 3 components, and layer 4 components. Layer 3 discovery may be implemented using active testing methods, for example an ICMP ping sweep of a range of IP addresses to determine if layer 3 devices exist and are reachable. Alternately, the retrieval of the IP ARP cache from one or more components, for example, may be used to discover the existence of layer 3 components in an IP network. Layer 4 discovery may be accomplished by active testing methods, for example by executing port connection tests for layer 4 ports on some or all layer 3 components. Alternately, for IP networks, the TCP connection table and the UDP connection may be requested from instrumented layer 3 devices support this table. These tables may provide a current list of the listening layer 4 ports. Layer 2 discovery may be accomplished by retrieving and processing the bridge tables from some or all of the instrumented layer 3 devices, for example. Information collected in this way may be used to automate actions related to creating and maintaining service definitions. Some or all of these discovery methods may be replaced and/or supplemented by manual configuration that provides similar information through user data entry.

The managed component capability services module 1308 may be used to discover the management agent capabilities of layer 3 devices. Layer 3 devices may be actively tested to determine if service ports associated with known management agents are active on layer 3 devices, for examples UDP and/or TCP ports 161 and/or 162 for SNMP management agents. Default service access parameters, for example default SNMP community strings such as "public" and "private" may be used, or alternately user-specified access parameters may be provided. Management agents may be queried, for example by doing a MIB walk on an SNMP agent, and the set of management agent capabilities thus discovered. Information collected in this way may be used to automate actions related to creating and maintaining service definitions. Some or all of these discovery methods may be replaced and/or supplemented by manual configuration that provides similar information through user data entry.

The evidence classification processing module 1310 may be used after evidence collection to order the collected evidence into a structured set. No classification need be done but operators may find it renders the data easier to use. "Evidence" as used herein refers to status information including information about components and/or information about the transactions. An "evidence set" as used herein refers to a collection of related evidence. Evidence may be classified by component type, for example router evidence, layer 2 bridge evidence, server evidence, J2EE middleware evidence, and so forth. This classified evidence may be further classified, for example J2EE middleware evidence may be classified into Java® Virtual Machine evidence, enterprise java bean evidence, JDBC connection pool evidence, and so forth.

Figure 14:
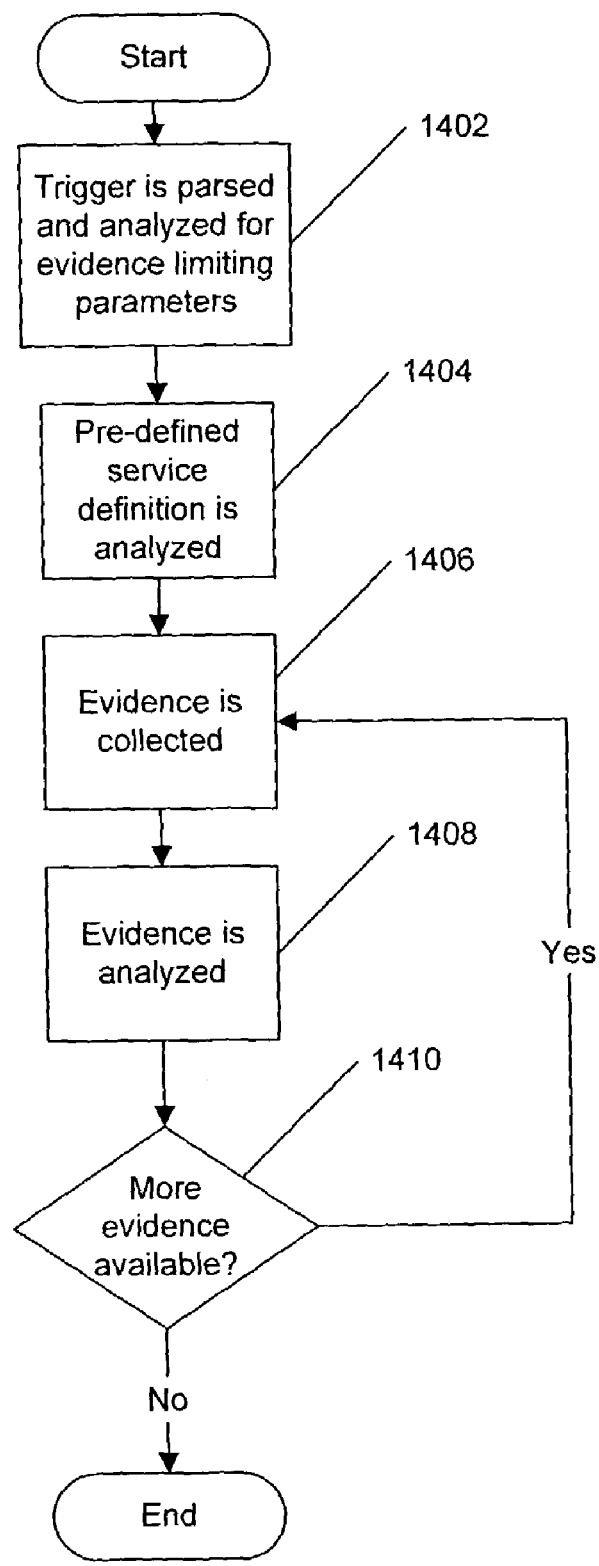
FIG. 14 is a flowchart illustrating operations for evidence analysis and triggered action according to embodiments of the present invention.

The evidence set selection, evidence analysis and triggered action module 1302 parses the status collection trigger message generated by 524 for evidence-limiting parameters to produce a limited set of evidence to collect, among other operations, as described in greater detail in reference to FIG. 14. Evidence may be collected, that evidence may be analyzed, and if the evidence collected points to additional evidence to be collected then further evidence may be collected and analyzed. These steps may be repeated until the evidence is exhausted, among other operations, as described in greater detail in reference to FIG. 14. The component retrieval module 1304 may be used to format evidence collection commands for transmittal over a network, to transmit these commands, and to receive the results of these commands which may then be forwarded to the evidence analysis and triggered action module 1302. For example, if the evidence to be collected is the System MIB available via an SNMP agent at IP address 192.168.1.1 using a community string of "public" these parameters may be formatted and sent to a software module such as the net-snmp open source software tools, where these parameters may be passed to the appropriate program module and formatted results returned.

FIG. 14 is a flow chart illustrating operations of the evidence analysis and triggered action module 1302 according to particular embodiments of the present invention. As seen in FIG. 14, the status collection trigger message generated by the transaction event correlation and trigger generation module 524 may be parsed and analyzed to limit the evidence to be collected 1402. For example, if the status collection trigger message contains a list of one or more destination IP addresses evidence may be collected only from agents associated with these addresses. Furthermore, this information may be combined in whole or in part with a pre-defined service definition for the service or services related to the transaction or transactions which caused the generation of the status collection trigger messages 1404. This service definition may be manually defined, as when a list of transaction-ids related to the service definition, management agents, their access parameters, and the evidence to be collected is created and stored, or the service definition may be created and/or modified through the use of automated methods, such as those described in the layer 2 to layer 4 discovery services module 1306 and/or the managed component capability module 1308, among others. A method which may be used to map the status collection trigger to a service definition may be through the transaction-id carried as a parameter in the status collection trigger message, among other methods. The service definitions may be examined to determine if the transaction-id is defined as part of the service definition, for example, and if so, then all evidence associated with the service definition may be collected and stored. Another method which may be used to map the status collection trigger to a service definition may be through the server network address, for example where service definitions are inspected for the occurrence of a server IP address and one or more service definitions containing this server IP address are used to define the evidence set. When enough of the evidence set is identified that evidence collection may begin evidence collection begins 1406. The evidence set may be passed to the component retrieval module 1304. The evidence set may contain all of the information necessary for the component retrieval module to retrieve the evidence. Once the evidence is retrieved it may be passed to the evidence classification and processing module 1310 for organization and storage, among other operations. The evidence collected may be further passed to the evidence analysis module 1408 where it may be analyzed for evidence that might further expand or limit the evidence set, among other analysis. If additional evidence is available 1410 the collection 1406 and analysis 1408 may be repeated. For example, a component server's process table may be inspected to discover active software components from which additional evidence may be collected. In this way the evidence set may be dynamically increased or reduced based upon a collection-time analysis of relationships between evidence sources.

While embodiments of the present invention have been describe with reference to packets of an Internet Protocol network, embodiments of the present invention may also be utilized with other network communication protocols. For example, cells of an ATM network may be evaluated as described herein. Accordingly, embodiments of the present invention should not be construed as limited to IP networks.

The flowcharts and block diagrams of FIGS. 1 through 14 illustrate the architecture, functionality, and operation of possible implementations of systems, methods and computer program products for monitoring of network traffic associated with a data processing system so as to allow, for example, problem determination and/or tuning of the data processing system associated with the network traffic according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be understood that each block of the block diagrams and/or flowchart illustrations, and combinations of blocks in the block diagrams and/or flowchart illustrations, can be implemented by special purpose hardware-based systems which perform the specified functions or acts, or combinations of special purpose hardware and computer instructions.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A method of collecting data processing system status information, comprising:
  passively monitoring network communications with the data processing system and observing transactions from the passively monitored network communications, the transactions include application level request/response pairs associated with the data processing system, the passively monitoring and observing comprises:
    filtering packets to discard packets for a first set of one or more application level protocols and keep packets for a second set of one or more application level protocols, assembling packets kept in the filtering into flows,
parsing flows for transaction content,
demarcating the transactions in the flows,
accessing user identification information in a login transaction,
accessing session identification information in the login transaction,
associating the session identification with the user identification;
analyzing the transactions observed from the passively monitored network communications to determine if the transactions comply with a quality standard;
accessing a particular transaction, other than the login transaction, that includes the session identification and does not include the user identification information;
using the session identification from the particular transaction to identify the user identification for the particular transaction based on the associating of the session identification with the user identification;
creating quality event messages for transactions that do not comply with the quality standard;
correlating like quality event messages;
determining whether the correlated like quality event messages as an aggregate meet a predefined service quality condition;
generating a trigger if the correlated like quality event messages as an aggregate meet the predefined service quality condition;
determining to generate the trigger in response to a problem transaction not complying with the quality standard without correlating a quality event message for the problem transaction if a user identification for the problem transaction is predetermined to require immediate action;
collecting a set of data processing system status information only in response to the generation of the trigger; and
storing the set of collected data processing system status information.

2. The method of claim 1, further comprising:
individually weighting quality event messages; and
creating a combined weight for the correlated like quality event messages as an aggregate based on the individual weightings of the quality event messages, wherein the determining whether the like correlated quality event messages as an aggregate meet the predefined service quality condition comprises comparing the combined weight for the correlated like quality event messages as an aggregate to a predetermined threshold value.

3. The method of claim 1, wherein:
the transaction is a retrieval of a web page; and the quality standard is a time limit on performing the transaction.

4. An apparatus for collecting data processing system status information, comprising:
a communication interface in communication with a network;
a storage device; and
a processor in communication with the communication interface and the storage device, the processor passively monitors network communications on the network, the network communications include packets being transmitted for a distributed data processing system, the processor assembles the packets into flows and analyzes the flows to search for transactions, the processor automatically identifies transactions in the flows, the processor analyzes the transactions to determine if the transactions comply with a quality standard, the processor creates quality event messages for transactions that do not comply with the quality standard, the processor correlates like quality event messages and determines whether the correlated like quality event messages meet a predefined service quality condition, the processor generates a trigger if the correlated like quality event messages meet the predefined service quality e condition, the processor causes system status information to be collected in response to the generation of the trigger, the collecting of status information includes initiating a collection process with one or more software components of the distributed data processing system to collect data from and about the one or more software components in response to the generation of the trigger, the processor determines to generate the trigger in response to a problem transaction not complying with the quality standard without correlating a quality event message for the problem transaction if a user identification for the problem transaction is predetermined to require immediate action;
when analyzing the transactions the processor accesses user identification information in a login transaction, accesses session identification information in the login transaction and associates the session identification with the user identification;
the processor accesses a particular transaction other than the login transaction that includes the session identification and does not include the user identification information, the processor uses the session identification from the particular transaction to identify the user identification for the particular transaction based on the association of the session identification with the user identification, the timing of a trigger for collecting data associated with the particular transaction is based on the user identification that was identified for the particular transaction based on the associating of the session identification with the user identification.

5. The method of claim 1, wherein the passively monitoring network communications further comprises:
receiving the network communications at an intermediate entity with respect to the network communications, the intermediate entity is on a network that is transmitting the network communications, the intermediate entity is physically separate from a source and destination of the network communications.

6. The method of claim 5, wherein:
the passively monitoring network communications includes receiving network communications from a mirrored port on a data center switch.

7. The apparatus of claim 4, wherein:
the processor individually weights event data for the transactions that do not comply with the quality standard;
the correlating includes the processor combing the individual weights; and
the condition is a threshold for the combined individual weights.

8. The apparatus of claim 4, wherein:
the processor monitors network communications at an intermediate position with respect to sources and destinations of the network communications using a mirrored port on a data center switch.

9. The apparatus of claim 4, wherein:
the processor monitors network communications at an intermediate position with respect to, and physically separate from, sources and destinations of the network communications.

10. A processor readable storage device having processor readable code embodied on the processor readable storage device, the processor readable code for programming a processor to perform a method comprising:
  passively monitoring communications on a network and observing a transaction from the passively monitored communications, the transaction includes an application level request/response pair associated with a data processing system, the passively monitoring and observing comprises:
    assembling packets into flows,
    parsing flows for transaction content,
    demarcating the transaction in the flows,
    accessing user identification information in a login transaction,
    accessing session identification information in the login transaction,
    associating the session identification with the user identification;
  analyzing the transaction observed from the monitored communications on the network to determine if the transaction complies with a quality standard;
  accessing a particular transaction, other than the login transaction, that includes the session identification and does not include the user identification information;
  using the session identification from the particular transaction to identify the user identification for the particular transaction based on the associating of the session identification with the user identification;
  creating new quality event messages for transactions that do not comply with the quality standard;
  correlating like quality event messages;
  determining whether the correlated like quality event messages as an aggregate meet a predefined service quality condition;
  generating a trigger if the correlated like quality event messages as an aggregate meet the predefined service quality condition; determining to generate the trigger in response to a problem transaction not complying with the quality standard without correlating a quality event message for the problem transaction if a user identification for the problem transaction is predetermined to require immediate action;
  collecting a set of data processing system status information only in response to the generation of the trigger; and
  storing the set of collected data processing system status information.

11. The processor readable storage device of claim 10, wherein:
  the method further comprises individually weighting quality event messages; and creating a combined weight for the correlated like quality event messages as an aggregate based on the individual weightings of the quality event messages, wherein the determining whether the like correlated quality event messages as an aggregate meet the predefined service quality condition comprises comparing the combined weight for the correlated like quality event messages as an aggregate to a predetermined threshold value.

12. The processor readable storage device of claim 10, wherein the monitoring network communications includes:
  gathering the network communications between a source and a destination using an entity that is physically separate from the source and the destination.

13. The method of claim 1, wherein:
  the data processing system is a distributed data processing system; and
  the collecting the set of data processing system status information comprises:
    in response to the trigger, initiating a collection process with one or more hardware components and one or more software components of the distributed data processing system to collect data from and about the one or more hardware components and one or more software components of the distributed data processing system after the trigger.

14. The method of claim 1, wherein:
  the generated trigger indicates one or more source network addresses, one or more destination network addresses, event information and transaction information; and
  the collecting the set of data processing system status information includes using the one or more source network addresses, one or more destination network addresses, event information and transaction information to identify and obtain relevant data processing system status information.

15. The method of claim 14, wherein the collecting the set of data processing system status information includes:
  parsing the generated trigger to identify the relevant processing system status information.

16. A method of collecting data processing system status information, comprising:
  passively monitoring network communications with the data processing system and observing transactions from the passively monitored network communications, the transactions include application level request/response pairs associated with the data processing system;
  analyzing the transactions observed from the passively monitored network communications to determine if the transactions comply with a quality standard;
  creating quality event information for transactions that do not comply with the quality standard;
  correlating the quality event information;
  determining whether the correlated quality event information meets a condition;
  generating a trigger if the correlated quality event information meets the condition the generated trigger identifies a transaction, a service definition is associated with the identified transaction, the service definition identifies entities to collect data processing system status information from;
  collecting a set of data processing system status information in response to the generation of the trigger, the collecting the set of data processing system status information includes collecting data processing system status information from the entities identified in the service definition;
  storing the set of collected data processing system status information; and
  automatically creating the service definition by performing an ICMP ping sweep of a range of IP addresses to determine if layer 3 devices exist, executing port connection tests for layer 4 ports on some or all of the layer 3 devices or requesting a TCP connection table from layer 3 devices, and retrieving and processing a bridge table from some or all of the layer 3 devices.

17. The method of claim 1, wherein the collecting data processing system status information includes:
  inspecting a server's process table to discover active software components.

18. The apparatus of claim 4, wherein
  the generated trigger indicates one or more source network addresses, one or more destination network addresses, event information, user identity information, and transaction information; and the collecting of status information includes using the one or more source network addresses, one or more destination network addresses, event information and transaction information to identify and obtain relevant data processing system status information.

19. The processor readable storage device of claim 10, wherein:
- the generated trigger identifies a transaction;
- a service definition for a service is associated with the identified transaction;
- the service definition identifies entities to collect data processing system status information from;
- the collecting system status information includes collect data processing system status information from the entities identified in the service definition; and
- the method further comprises automatically creating the service definition by performing an ICMP ping sweep of a range of IP addresses to determine if layer 3 devices exist, executing port connection tests for layer 4 ports on some or all of the layer 3 devices or requesting a TCP connection table from layer 3 devices, and retrieving and processing a bridge table from some or all of the layer 3 devices.

20. The method of claim 1, further comprising:
creating user weights, transaction type weights and event type weights for quality event messages;
- combining the user weights, transaction type weights and event type weights for quality event messages to create combined weights for the quality event messages; and
- creating a combined weight for the correlated like quality event messages as an aggregate by combining the combined weights for the quality event messages, wherein the determining whether the like correlated quality event messages as an aggregate meet the predefined service quality condition comprises comparing the combined weight for the correlated like quality event messages as an aggregate to a predetermined threshold value.

\* \* \* \* \*